United States Patent
Lin et al.

(10) Patent No.: US 10,190,566 B2
(45) Date of Patent: Jan. 29, 2019

(54) MODULARIZED OCEAN ENERGY GENERATING DEVICE AND BUILT-IN MODULE THEREOF

(71) Applicant: HANGZHOU LINDONG NEW ENERGY TECHNOLOGY INC., Hangzhou, Zhejiang Province (CN)

(72) Inventors: Dong Lin, Hangzhou (CN); Changzheng Huang, Hangzhou (CN); Zhenghan Chen, Hangzhou (CN); Qiancheng Xu, Hangzhou (CN)

(73) Assignee: HANGZHOU LINDONG NEW ENERGY TECHNOLOGY INC., Hangzhou, Zhejiang Province (CN)

( * ) Notice: Subject to any disclaimer, the term of this patent is extended or adjusted under 35 U.S.C. 154(b) by 0 days.

(21) Appl. No.: 15/707,579

(22) Filed: Sep. 18, 2017

(65) Prior Publication Data

US 2018/0010569 A1 Jan. 11, 2018

Related U.S. Application Data

(63) Continuation of application No. 14/363,679, filed as application No. PCT/CN2014/072874 on Mar. 4, 2014, now Pat. No. 9,765,752.

(30) Foreign Application Priority Data

| Aug. 6, 2013 | (CN) | ..................... 2013 2 0476523 U |
| Dec. 23, 2013 | (CN) | .......................... 2013 1 0717965 |
| Jan. 3, 2014 | (CN) | .......................... 2014 1 0005969 |

(51) Int. Cl.
*F03B 13/10* (2006.01)
*F03B 13/26* (2006.01)
(Continued)

(52) U.S. Cl.
CPC ................ *F03B 13/10* (2013.01); *F03B 3/04* (2013.01); *F03B 11/02* (2013.01); *F03B 13/264* (2013.01);
(Continued)

(58) Field of Classification Search
CPC ......... Y02E 10/38; Y02E 10/28; Y02E 10/22; Y02E 10/72; F03B 13/20; F03B 17/061; F03B 13/1815; F03B 13/186
(Continued)

(56) References Cited

U.S. PATENT DOCUMENTS

| 244,221 A | 7/1881 | McDonald |
| 1,684,469 A | 9/1928 | Buda |

(Continued)

FOREIGN PATENT DOCUMENTS

| CN | 101666287 A | 3/2010 |
| CN | 201606182 U | 10/2010 |

(Continued)

*Primary Examiner* — Tulsidas C Patel
*Assistant Examiner* — Charles Reid, Jr.
(74) *Attorney, Agent, or Firm* — Muncy, Geissler, Olds & Lowe, P.C.

(57) ABSTRACT

This invention provides a modularized ocean energy generating device and a built-in module thereof. The built-in module includes an inner frame, at least one hydraulic generator module, at least one mounting shaft, at least one driving unit, and at least two barriers. The modularized ocean energy generating device includes an outer frame, and the inner frame is detachably disposed in the outer frame. The hydraulic generator module is disposed in the inner frame and is mounted at the at least one mounting shaft, and the at least one mounting shaft is rotatably mounted at the inner frame. The driving unit is connected to the mounting shaft to drive the mounting shaft to rotate. The barriers are disposed at the inner frame or the outer frame and located at (Continued)

upstream and downstream sides of the hydraulic generator module along a water flow direction, respectively.

18 Claims, 21 Drawing Sheets

(51) Int. Cl.
    *F03B 17/06* (2006.01)
    *F03B 3/04* (2006.01)
    *F03B 11/02* (2006.01)

(52) U.S. Cl.
    CPC ...... *F03B 17/061* (2013.01); *F05B 2230/601* (2013.01); *F05B 2240/40* (2013.01); *Y02E 10/28* (2013.01); *Y02E 10/38* (2013.01); *Y02P 70/527* (2015.11)

(58) Field of Classification Search
    USPC .......................... 290/42, 43, 53, 54
    See application file for complete search history.

(56) References Cited

U.S. PATENT DOCUMENTS

| | | | |
|---|---|---|---|
| 3,134,231 A | 5/1964 | McCreery | |
| 3,922,012 A | 11/1975 | Herz | |
| 4,075,500 A | 2/1978 | Oman et al. | |
| 4,134,707 A | 1/1979 | Ewers | |
| 4,447,740 A | 5/1984 | Heck | |
| 4,720,640 A | 1/1988 | Anderson et al. | |
| 6,836,028 B2 | 12/2004 | Northrup et al. | |
| 6,939,101 B2 | 9/2005 | Yu et al. | |
| 7,018,166 B2 | 3/2006 | Gaskell | |
| 7,215,036 B1* | 5/2007 | Gehring | F03B 17/061 290/54 |
| 8,123,482 B2 | 2/2012 | Achard et al. | |
| 8,308,424 B2 | 11/2012 | Park et al. | |
| 2004/0007881 A1 | 1/2004 | Kobashikawa et al. | |
| 2008/0012345 A1 | 1/2008 | Parker | |
| 2008/0157528 A1 | 7/2008 | Wang et al. | |
| 2008/0258467 A1* | 10/2008 | Wilson | F03B 11/02 290/54 |
| 2009/0115193 A1* | 5/2009 | Branco | F03B 13/10 290/54 |
| 2009/0121572 A1 | 8/2009 | Sundermann | |
| 2010/0032951 A1 | 2/2010 | Collee et al. | |
| 2010/0072752 A1* | 3/2010 | Park | F03B 13/26 290/52 |
| 2011/0091312 A1* | 4/2011 | Park | F03B 11/00 415/73 |
| 2011/0285136 A1 | 11/2011 | Desmeules | |
| 2011/0304144 A1 | 12/2011 | Dehlsen et al. | |
| 2013/0031897 A1 | 2/2013 | Hagemann et al. | |
| 2013/0320678 A1 | 12/2013 | Kittel | |
| 2014/0138954 A1 | 5/2014 | Antonucci et al. | |

FOREIGN PATENT DOCUMENTS

| | | | |
|---|---|---|---|
| CN | 101910616 A | 12/2010 | |
| CN | 102230440 A | 11/2011 | |
| CN | 102230445 A | 11/2011 | |
| CN | 102828886 A | 12/2012 | |
| FR | 2898941 A1 | 9/2007 | |
| GB | 2490737 A | 11/2012 | |
| JP | 10-176650 A | 6/1998 | |
| JP | 2007-9833 A | 1/2007 | |
| KR | 10-0878632 B1 | 1/2009 | |
| KR | 10-2012-0026480 A | 3/2012 | |
| NL | 1034952 C2 | 7/2009 | |
| WO | WO 2012103654 A1 * | 8/2012 | ........... F03B 13/264 |
| WO | WO2012103654 A1 | 8/2012 | |

* cited by examiner

111

MODULARIZED OCEAN ENERGY GENERATING DEVICE AND BUILT-IN MODULE THEREOF

CROSS-REFERENCE TO RELATED APPLICATIONS

The present application is a Continuation-In-Part of U.S. patent application Ser. No. 14/363,679, filed on Jun. 6, 2014, which is a U.S. National Stage of International Application No. PCT/CN2014/072874 filed on Mar. 4, 2014, for which priorities are claimed under 35 U.S.C. § 120, the entire contents of all of which are hereby incorporated by reference.

BACKGROUND OF THE INVENTION

Field of the Invention

The present invention relates to an ocean energy generating field and, more particularly, to a modularized ocean energy generating device and a built-in module thereof.

Description of the Related Art

Ocean energy (including tidal current energy, ocean wave energy, and ocean current energy) refers to mechanical energy generated by the flowing of sea water. As a kind of renewable energy, the ocean energy has great development prospect and value due to its abundant reserve and wide distribution. The primary use of the ocean energy is for power generation. The working principle of ocean energy power generation is similar to that of wind power generation and conventional hydropower generation. That is, the mechanical energy of the sea water is converted into electric energy by energy conversion devices. Specifically, at first, the sea water impacts hydro turbines, the hydro turbines convert the energy of the water flow into the mechanical energy of rotation, and then the hydro turbines drive power generators to generate power via mechanical drive systems, thereby finally converting the mechanical energy to the electric energy.

Nowadays, with the increasing shortage of energy and the increasing serious green house effect, energy is required to be low-carbon. Thus, clean energy, such as wind energy and the ocean energy (including tidal energy, the tidal current energy, the ocean wave energy, and the ocean current energy), is the future direction of energy development. However, the power generating devices for the clean energy are still developing, and the utilization of the ocean energy is still in an initial stage, except the relatively mature wind energy utilization. No general-purpose and proven devices are available. The efficiency is relatively low, and it is difficult to realize large-scale devices.

Since the ocean environment is complicated and the water resistance is large, the installation of the conventional ocean energy power generator in the ocean has great difficulties and needs large costs. In addition, since the power generator contacts the sea water over a long period of time, under long corrosion and huge impaction of the sea water, the ocean energy power generator need to be regularly preserved or replaced after using a period of time. However, the preservation and replacement of the conventional ocean energy power generator in the ocean has great difficulties and needs large costs. The whole ocean energy power generator may be discarded even as damage of part components, which is one important reason causing large costs of the ocean energy power generator and is also a direct reason causing the conventional ocean energy power generator failing to realize large-scale and commercialized operation.

Since a whole horizontal-axis hydraulic generator (including an impeller and a generator) is under water, the preservation and repair of the horizontal-axis hydraulic generator is more difficult and the cost is higher. Even though the power generating efficiency of the horizontal-axis hydraulic generator is better than that of a vertical-axis hydraulic generator, the horizontal-axis hydraulic generator still fails to be commercialized. However, technical persons in the ocean energy power generating field overlook improvement of preservation and repair modes thereof.

In addition, the conventional ocean energy power generator generally includes one or two hydraulic generators. However, as one or two hydraulic generator is used, to improve generating power, the diameter of the impeller needs to be big, thus greatly reducing a rotating speed of the impeller and increasing a torsion torque, thereby increasing friction between a central shaft and a gear box and increasing costs of the central shaft and the gear box. In addition, the scale of the whole power generator may be limited, and the cost of the power generator is higher, thereby limiting development of the ocean energy power generator.

However, at present, the technical persons in the ocean energy power generating field have technical bias, only focusing on how to enlarge the impeller of the hydraulic generator or how to improve the structure of blades of the impeller further to improve the generating power of the single hydraulic generator. At present, no persons in the field research how to improve the generating power and to reduce the costs to facilitate commercialization on the premise that the impeller is not changed.

Specially, there is a lot of garbage in the ocean. If the impeller is surrounded by ocean garbage such as fishing nets, the impeller of the conventional ocean energy power generating device is easily damaged. In some cold areas, there is broken ice in the ocean, and these floating ice will hit the impeller too. The existing ocean energy power generating device cannot block the external garbage or floating ice effectively.

BRIEF SUMMARY OF THE INVENTION

This invention provides a modularized ocean energy generating device and a built-in module thereof.

According to one aspect of the invention, the invention provides a built-in module for a modularized ocean energy generating device. The built-in module includes an inner frame, at least one hydraulic generator module, at least one mounting shaft, at least one driving unit, and at least two barriers. The modularized ocean energy generating device includes an outer frame, and the inner frame is detachably disposed in the outer frame. The at least one hydraulic generator module is disposed in the inner frame, and a direction of an axis of the hydraulic generator module is parallel to a horizontal plane. The at least one hydraulic generator module is mounted at the at least one mounting shaft, and the at least one mounting shaft is rotatably mounted at the inner frame. The driving unit is connected to the mounting shaft to drive the mounting shaft to rotate. The at least two barriers are disposed at the inner frame or the outer frame and located at upstream and downstream sides of the hydraulic generator module along a water flow direction, respectively.

According to one embodiment of the invention, the built-in module may further include at least one water flow deflector fixed to the inner frame or the outer frame.

According to one embodiment of the invention, the water flow deflector may be cylindrical, and the diameter of the water flow deflector may decrease gradually.

According to one embodiment of the invention, the built-in module may further include at least one water flow limiting plate disposed at the inner frame or the outer frame.

According to one embodiment of the invention, the built-in module may further include at least one buoy platform disposed at the outer frame and parallel to the horizontal plane.

According to one embodiment of the invention, the built-in module may further include at least two buoy units disposed at two sides of the inner frame or the outer frame, and each buoy unit may be parallel to the water flow direction and vertical to the horizontal plane.

According to one embodiment of the invention, the built-in module may further include a dragging ring and a dragging chain, and the dragging ring may be disposed at the outer frame, and one end of the dragging chain may be disposed at the dragging ring.

According to one embodiment of the invention, the built-in module may further include a fixing device, and the fixing device may include a base, a fixing unit, and a plurality of anchor piles. The base may have a fixing groove. The outer frame may be fixed to the fixing groove of the base via the fixing unit. At least one of the anchor piles may be disposed through the base and may be inserted into the seabed to be fixed.

According to one embodiment of the invention, the driving unit may be located above a water surface.

According to another aspect of the invention, the invention further provides a modularized ocean energy generating device including an outer frame and at least on built-in module. The built-in module includes an inner frame, at least one hydraulic generator module, at least one mounting shaft, at least one driving unit, and at least two barriers. The modularized ocean energy generating device includes an outer frame, and the inner frame is detachably disposed in the outer frame. The at least one hydraulic generator module is disposed in the inner frame, and a direction of an axis of the hydraulic generator module is parallel to a horizontal plane. The at least one hydraulic generator module is mounted at the at least one mounting shaft, and the at least one mounting shaft is rotatably mounted at the inner frame. The driving unit is connected to the mounting shaft to drive the mounting shaft to rotate. The at least two barriers are disposed at the inner frame or the outer frame and located at upstream and downstream sides of the hydraulic generator module along a water flow direction, respectively.

According to one embodiment of the invention, the modularized ocean energy generating device may further include at least one water flow deflector fixed to the inner frame or the outer frame.

According to one embodiment of the invention, the water flow deflector may be cylindrical, and the diameter of the water flow deflector may decrease gradually.

According to one embodiment of the invention, the modularized ocean energy generating device may further include at least one water flow limiting plate disposed at the inner frame or the outer frame.

According to one embodiment of the invention, the modularized ocean energy generating device may further include at least one buoy platform disposed at the outer frame and parallel to a horizontal plane.

According to one embodiment of the invention, the modularized ocean energy generating device may further include at least two buoy units disposed at two sides of the outer frame, and each buoy unit may be parallel to a water flow direction and is vertical to a horizontal plane.

According to one embodiment of the invention, the modularized ocean energy generating device may further include a dragging ring and a dragging chain, the dragging ring may be disposed at the outer frame, and one end of the dragging chain may be disposed at the dragging ring.

According to one embodiment of the invention, the modularized ocean energy generating device may further include a fixing device, and the fixing device may include a base, a fixing unit, and a plurality of anchor piles. The base may have a fixing groove. The outer frame may be fixed to the fixing groove of the base via the fixing unit. At least one of the anchor piles may be disposed through the base and is inserted into the seabed to be fixed.

According to one embodiment of the invention, the driving unit may be located above a water surface.

To sum up, the built-in module can be separatably coupled to the outer frame, thereby enabling the modularized assembly and replacement for the generating device. The inner frame, the hydraulic generator module, the mounting shaft, the driving unit, and the barriers form the built-in module as a whole, and the built-in module can be hung and then transferred into the outer frame from top to bottom. Therefore, the assembly and replacement of the built-in module for the modularized ocean energy generating device can be realized above the water surface, preservation and installation costs are greatly reduced, and the problem that the conventional ocean energy power generator fails to be large-scale and commercialized is overcome. Further, by at least two barriers or fences disposed at upstream and downstream sides, the modularized ocean energy generating device in the embodiment of the invention prevents rubbish/garbage or floating ice in the ocean from damaging the hydraulic generator module, thereby prolonging the service life of the hydraulic generator module. In addition, by the rotatable mounting shaft, the impeller of the horizontal-axis hydraulic generator are allowed to always face the water flow, regardless of which direction the water flow flows into, thereby ensuring the maximum generating power. This case is particularly appropriate for power generation by tidal energy.

Specially, if the barriers are disposed at the inner frame, the cleaning or removal of the garbage on the barriers or the replacement or repair of the barriers can be carried out by lifting the built-in module from bottom to top, which is very convenient and greatly save the maintenance costs.

In one embodiment, a plurality of the horizontal-axis hydraulic generators can be mounted on one mounting shaft, thereby greatly improving the generating power. By the water flow deflector, the water flow is intensively guided to the horizontal-axis hydraulic generator, such that the impeller of the horizontal-axis hydraulic generator bear greater stress and rotate faster, thus to improve the power generation efficiency.

Preferably, the water flow deflectors can be disposed at upstream and downstream sides of the horizontal-axis hydraulic generator. Thus, even if the tidal current changes the direction (such as a rising tide and a falling tide), the water flow deflector can effectively guide the water flow.

Specially, the driving unit in the embodiment is located above the water surface instead of being below the water surface, which greatly prolongs the service life of the driving unit, reducing the maintenance costs and facilitating maintenance work.

In the embodiment of the invention, the water flow limiting plate prevents the garbage or floating ice in the ocean form damaging the hydraulic generator modules and prevents the water flow in other directions from interfering with the hydraulic generator modules, thereby improving the power generating efficiency of the generator modules.

In the embodiment of the invention, the modularized ocean energy generating device may be fixed in a floating type via the buoy platform or the buoy unit and may also be fixed to the seabed via the fixing device. In addition, by the dragging ring and the dragging chain, the modularized ocean energy generating device may be effectively fixed in the water, and it is also convenient for maintenance and repair.

These and other features, aspects, and advantages of the present invention will become better understood with regard to the following description, appended claims, and accompanying drawings.

DETAILED DESCRIPTION OF THE INVENTION

Figure 1:
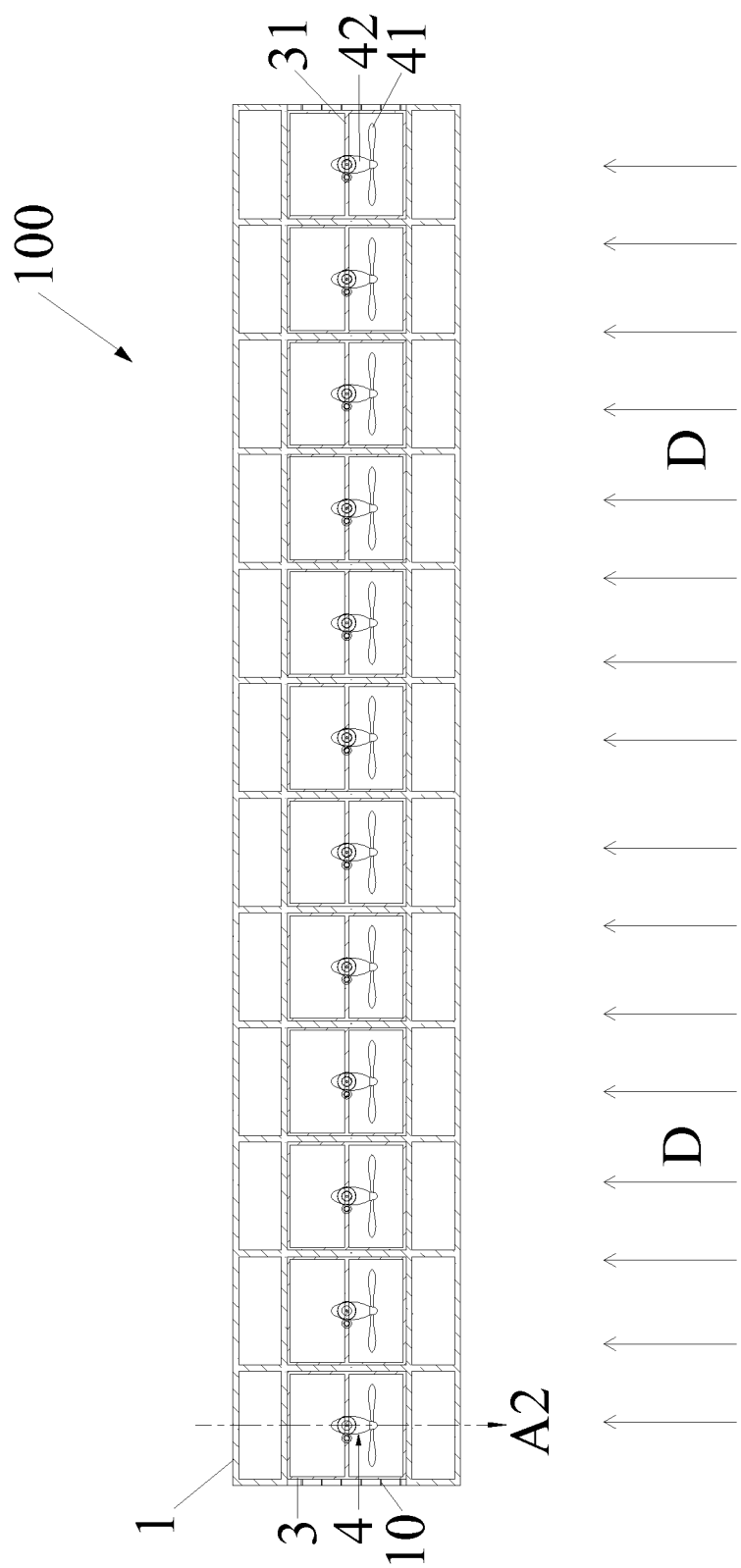
FIG. 1 is a top view of a modularized ocean energy generating device according to the first embodiment of the invention.
Figure 2:
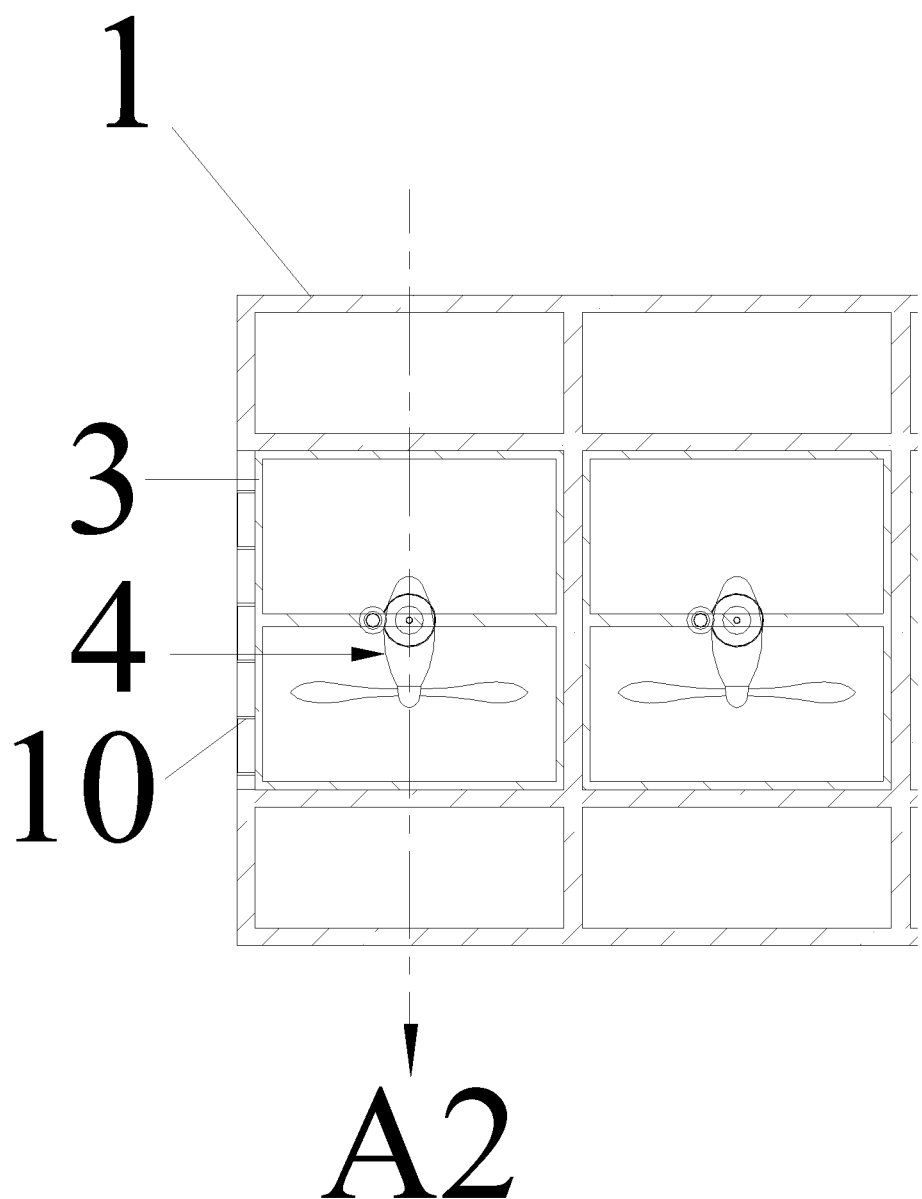
FIG. 2 is a partially enlarged view of FIG. 1.
Figure 3:
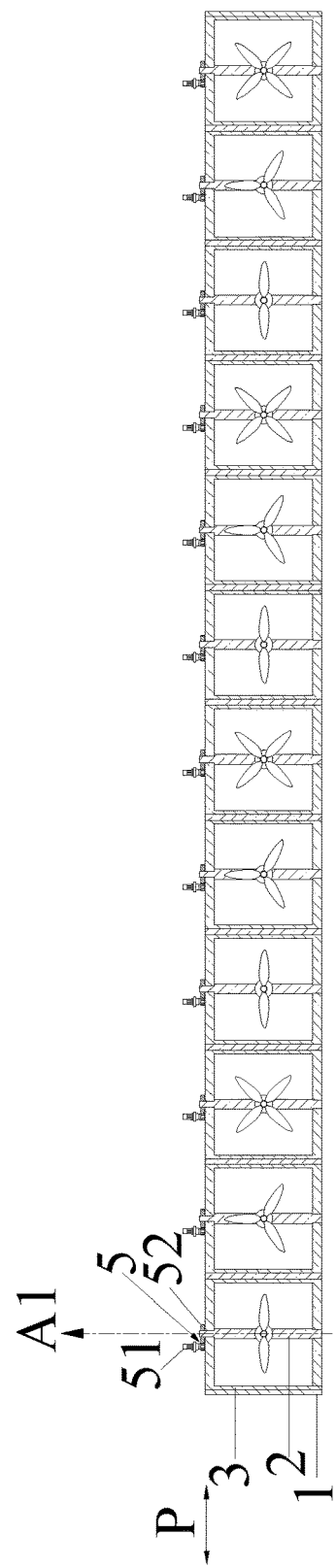
FIG. 3 is a sectional front view of FIG. 1.
Figure 4:
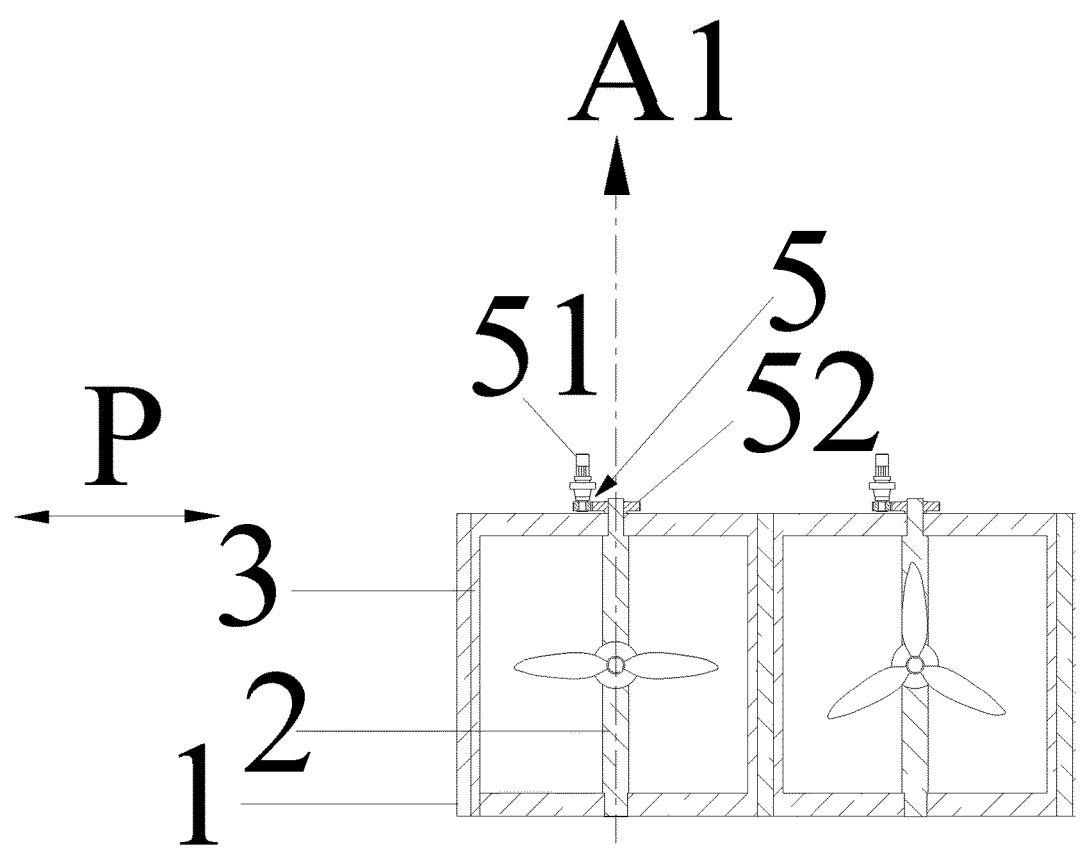
FIG. 4 is a partially enlarged view of FIG. 3.

FIG. 1 is a top view of a modularized ocean energy generating device according to the first embodiment of the invention. FIG. 2 is a partially enlarged view of FIG. 1. FIG. 3 is a sectional front view of FIG. 1. FIG. 4 is a partially enlarged view of FIG. 3. Please refer to FIG. 1 to FIG. 4 together. A modularized ocean energy generating device 100 includes an outer frame 1 and at least one built-in module. The built-in module includes an inner frames 3, at least one hydraulic generator modules 4, at least one mounting shaft 2, at least one driving unit 5, and at least two barriers 111.

In the embodiment, the outer frame 1 is formed of steel and has a design for reducing resistance of water flow. Thus, the outer frame 1 is light in weight, simply structured, easy to process and manufacture, convenient to install, adjust and dismantle, and suitable for engineering applications.

The inner frame 3 is detachably disposed in the outer frame 1. In the embodiment, the inner frame 3 may have a hook, and the outer frame 1 may have a slot. The inner frame 3 is inserted into the outer frame 1 via the engagement of the hook and the slot. However, the fixing mode between the inner frame 3 and the outer frame 1 in the invention is not limited.

In the embodiment of the invention, there are several hydraulic generator modules 4 in this embodiment, and the hydraulic generator modules 4 are distributed in an array via arrayed disposition of the inner frames 3. As the number of the hydraulic generator modules 4 is increased, the impeller of each hydraulic generator module 4 do not need to be enlarged. On the premise of improving generating power of the whole generating device, manufacturing costs of the hydraulic generator module 4 are greatly reduced, service life of the hydraulic generator module 4 is prolonged, and the technology bias that the research priority in the prior art only focuses on enlarging the single hydraulic generator is overcome.

One inner frame 3, one hydraulic generator module 4, one driving unit 5, and at least two barriers 111 form a built-in module. In other words, each built-in module includes one inner frame 3, at least one hydraulic generator module 4, at least one mounting shaft 2, at least one driving unit 5, and at least two barriers 111. In a practical application, the hydraulic generator module 4 and the driving unit 5 may be first fixed to the inner frame 3, and then the built-in module is hanged and transferred into the outer frame 1 to be fixed, thereby realizing modularized installation and arrayed distribution of the hydraulic generator modules 4. In detail, the built-in module may be installed ashore, and then the built-in module can be lifted by a lifting machine such as a crane and then transferred into the outer frame 1 in the ocean from top to bottom, thereby greatly simplifying installing procedures, reducing installing time, and reducing installing difficulties in the ocean.

In the first embodiment, the hydraulic generator module 4 includes a horizontal-axis hydraulic generator, and a direction A2 of an axis of the horizontal-axis hydraulic generator is parallel to a horizontal plane P. The horizontal-axis hydraulic generator includes an impeller 41 and a generator 42, and the direction A2 of the axis of the horizontal-axis hydraulic generator is a direction of an axis of the impeller 41 of the horizontal-axis hydraulic generator.

Since the impeller 41 and the generator 42 of the horizontal-axis hydraulic generator are underwater, if the horizontal-axis hydraulic generator has a fault, the conventional ocean energy power generator needs to be preserved in the ocean. This preservation is difficult and large costs are needed. However, as for the modularized ocean energy generating device 100 in the embodiment of the invention, the built-in module can be directly pulled out from the ocean for preservation or replacement, thereby realizing fast replacement and preservation of the ocean energy generating device, greatly reducing preserving costs, and allowing commercialization of the modularized ocean energy generating device 100 to be realized.

In the embodiment, at least one horizontal-axis hydraulic generator is correspondingly mounted on the mounting shaft 2, and at least one mounting shaft 2 is correspondingly mounted on each inner frame 3. In the embodiment, a direction A1 of an axis of the mounting shaft 2 is vertical to the horizontal plane P. However, the invention is not limited thereto. In other embodiments, the direction A1 of the axis of the mounting shaft 2 may be parallel to the horizontal plane P. One inner frame 3, the corresponding mounting shaft 2, and the horizontal-axis hydraulic generator together form the built-in module. In other words, each built-in module includes at least one mounting shaft 2 and at least one horizontal-axis hydraulic generator. In the embodiment, the number of the inner frame 3 is equal to the number of the mounting shaft 2, and the number of the horizontal-axis hydraulic generator is also equal to the number of the mounting shaft 2. However, the invention is not limited thereto. In other embodiments, one built-in module may include a plurality of mounting shafts 2 and a plurality of hydraulic generator modules 4.

In the embodiment, the mounting shaft 2 is rotatably mounted on the inner frame 3. By the rotatable mounting shaft 2, the impeller 41 of the horizontal-axis hydraulic generator are allowed to always face the water flow, regardless of which direction the water flow flows into, thereby ensuring the maximum generating power. Since a water flow direction of a rising tide and a water flow direction of a falling tide are opposite, the modularized ocean energy generating device 100 including the rotatable mounting shaft 2 is particularly suitable for tidal current energy power generation. In the embodiment, in FIG. 1, the cross-section of the inner frame 3 when overlooked is rectangular, with a crosspiece 31 in the middle of the rectangular cross-section. Two ends of the mounting shaft 2 are rotatably disposed at the crosspiece 31.

In the embodiment, the modularized ocean energy generating device 100 further includes at least one driving unit 5, and the driving unit 5 is connected to the mounting shaft 2 to drive the mounting shaft 2 to rotate. In the embodiment, the number of the driving unit 5 corresponding to the number of the mounting shaft 2 is at least four. Each driving unit 5 includes a motor 51 and a driving mechanism 52. The driving mechanism 52 is connected to one end (an upper end in FIG. 4) of the mounting shaft 2, and the motor 51 drives the mounting shaft 2 to rotate via the driving mechanism 52. In the embodiment, the driving mechanism 52 includes a main driven gear and a follower gear engaged with the main driven gear. The motor 51 drives the main driven gear to rotate, thereby driving the follower gear to rotate. A gear hole of the follower gear fits tightly with an upper end of the mounting shaft 2, thereby driving the mounting shaft 2 to rotate. However, the invention is not limited thereto. In other embodiments, the driving unit may include a motor and a reducer. Since the existing motor rotates fast, and the rotating rate of the motor is greatly reduced by the reducer, the rotating rate and the rotating range of the mounting shaft 2 may be controlled effectively and precisely. In this embodiment, the driving unit 5 is located above a water surface which is the horizontal plane P in FIG. 3 and FIG. 4.

In a practical application, when the water flow flows into the modularized ocean energy generating device 100 along a water flow direction D in FIG. 1, the driving unit 5 does not operate. At that moment, the impeller 41 of the horizontal-axis hydraulic generator face the water flow. When the water flow flows into the modularized ocean energy generating device 100 along a direction opposite to the water flow direction D (from top to bottom in FIG. 1), the driving unit 5 drives the mounting shaft 2 to rotate, thus to drive the horizontal-axis hydraulic generator to rotate 180 degrees. Thus, the impeller 41 are changed to face top from facing down, thereby ensuring that the impeller 41 of the horizontal-axis hydraulic generator always face the water flow. This case is particularly appropriate for power generation by tidal current energy, further to ensure the maximum generating power.

In the embodiment, the horizontal-axis hydraulic generator may be one generator with two blades, one generator with three blades, one generator with four blades, or a combination thereof. However, the invention does not limit the number of the blades of the impeller 41 for the horizontal-axis hydraulic generator.

In the embodiment, the modularized ocean energy generating device 100 further includes at least one water flow limiting plate 10 disposed at the inner frame 3 or the outer frame 1. Preferably, the modularized ocean energy generating device 100 includes at least two water flow limiting plates 10, and the two water flow limiting plates 10 are disposed at two sides of the inner frame 3 or the outer frame 1. In detail, the two water flow limiting plates 10 may be located at the left side and right side of the outer frame 1 in FIG. 1. By the water flow limiting plates 10 disposed at two sides, the water flow may be centralized in the outer frame 1 as more as possible, and the water flow is avoided flowing from two sides, thereby allowing the water flow to directly flow into the impellers 41 and to drive the impellers 41 to rotate, thus improving the generating power. However, the number and disposing position of the water flow limiting plate 10 are not limited in the invention. In other embodiments, the water flow limiting plate 10 may further be disposed at the bottom of the outer frame 1.

In addition, since the ocean environment is complicate, although the main direction of the water flow is the water flow direction D and its opposite direction, occasionally the water flow in other directions may interfere. Via the two water flow limiting plates 10, interference of the water flow in other directions for the impellers 41 can be avoided, and each impeller 41 can be ensured to stably rotate along one direction, thereby improving the power generating efficiency of the hydraulic generator module 4. Further, by the water flow limiting plate 10, the closeness of the outer frame 1 can be properly improved, and the rubbish in the ocean is prevented from entering into the outer frame 1 to damage the hydraulic generator module 4.

Figure 11:
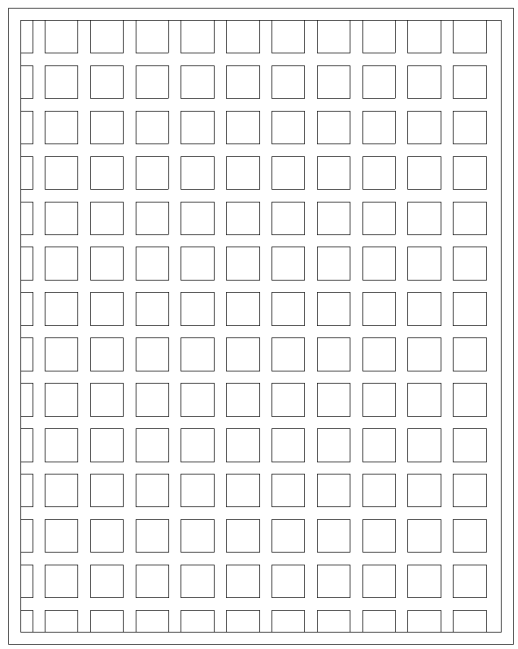
FIG. 11 is a schematic diagram showing a barrier of the modularized ocean energy generating device according to the first, second or third embodiment of the invention.

In the embodiment, the modularized ocean energy generating device further includes at least two barriers 111 (as shown in FIG. 11). The two barriers 111 are disposed at the inner frame 3 or the outer frame 1. The at least two barriers 111 are located at the upstream and downstream sides of the hydraulic generator module 4 along the water flow direction D, respectively. The barriers 111 are vertical to the water flow direction D and are vertical to the horizontal plane P. By the barriers 111, the ocean garbage or floating ice can be effectively prevented from drawing into the hydraulic generator module 4, thereby protecting the hydraulic generator module 4 and prolonging the service life of the hydraulic generator module 4. In FIG. 11, the barrier 111 has lattice-type lines, and the barrier 111 may be made of steel wire. However, the invention is not limited.

Specially, the barriers 111 can be disposed at the inner frame 3. Thus, the cleaning or removal of the garbage on the barriers or the replacement or repair of the barriers can be carried out by lifting the built-in module from bottom to top, which is very convenient and greatly save the maintenance costs.

Figure 5:
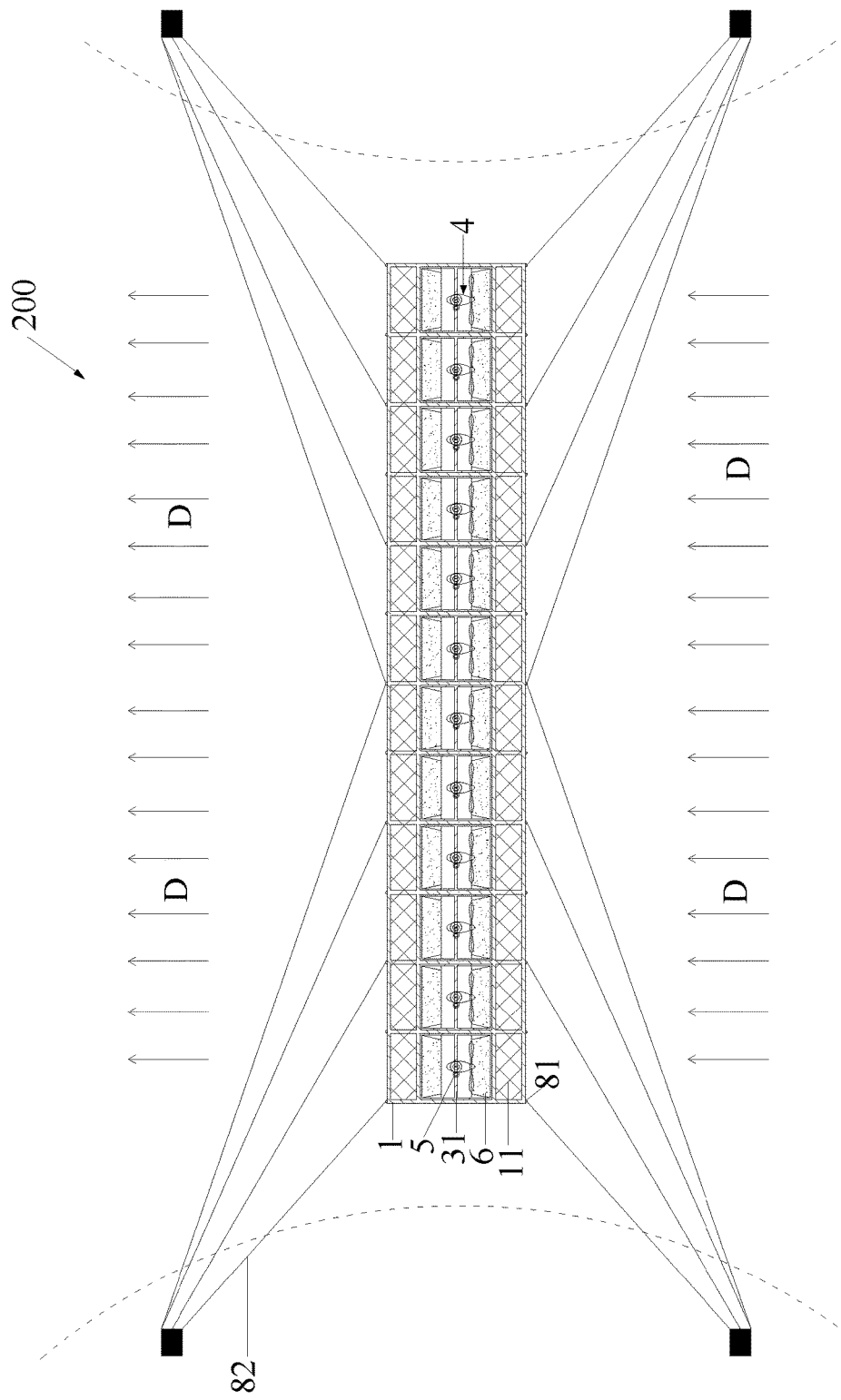
FIG. 5 is a top view of a modularized ocean energy generating device according to the second embodiment of the invention.
Figure 6:
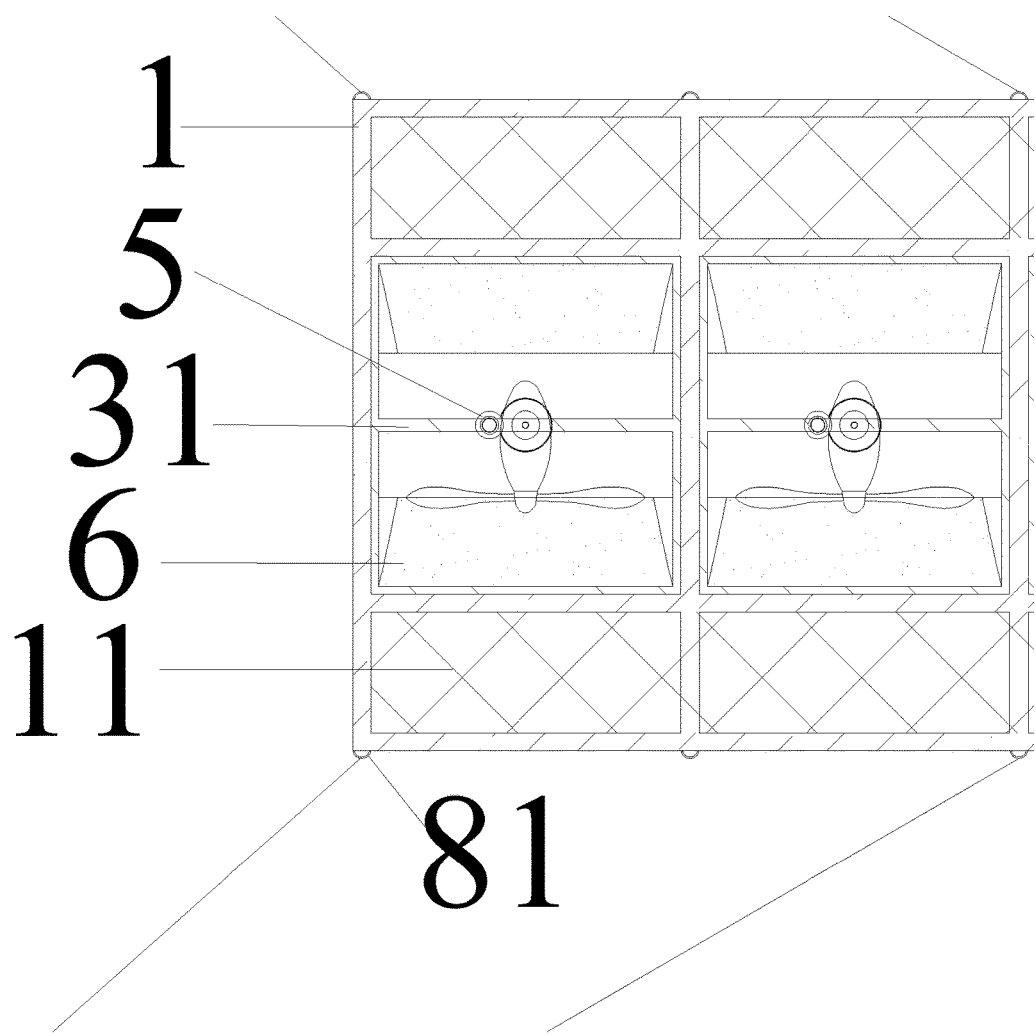
FIG. 6 is a partially enlarged view of FIG. 5.
Figure 7:
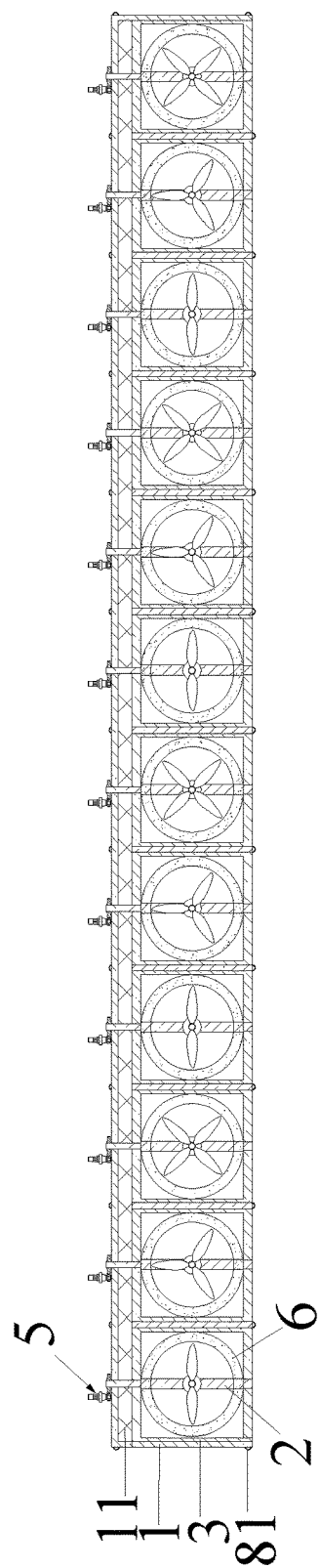
FIG. 7 is a sectional front view of FIG. 5.
Figure 8:
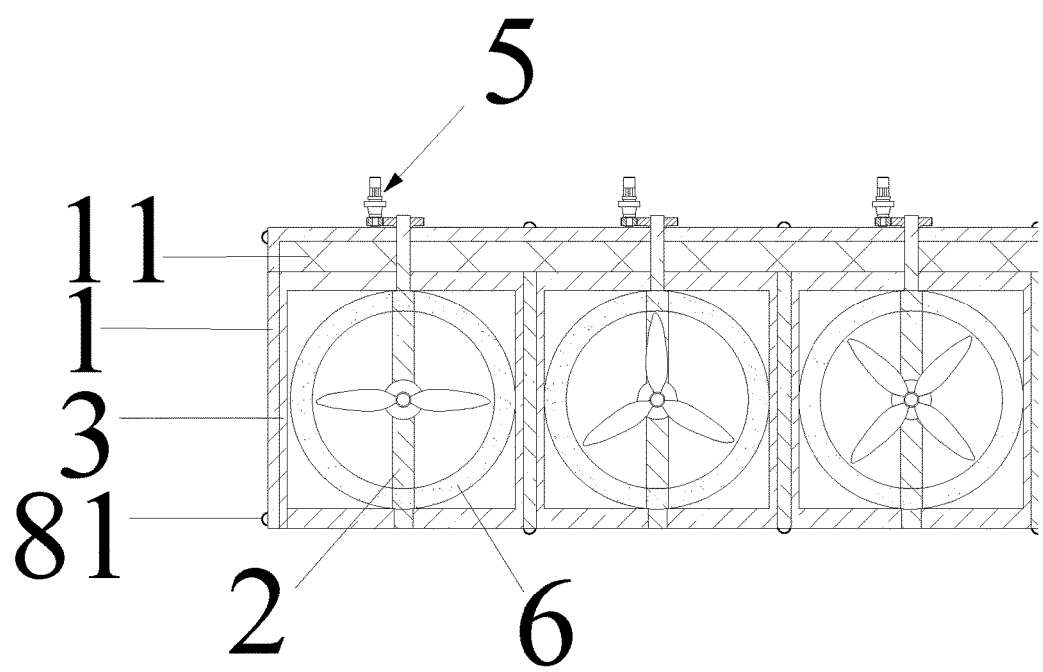
FIG. 8 is a partially enlarged view of FIG. 7.

FIG. 5 is a top view of a modularized ocean energy generating device according to the second embodiment of the invention. FIG. 6 is a partially enlarged view of FIG. 5. FIG. 7 is a sectional front view of FIG. 5. FIG. 8 is a partially enlarged view of FIG. 7. Please refer to FIG. 5 to FIG. 8 together.

In the second embodiment, the structures and functions of the outer frame 1, the mounting shaft 2, the inner frame 3, the hydraulic generator module 4, the driving unit 5, and the barriers 111 are described as the first embodiment. The same elements are marked by the same reference numerals and not described in detail for a concise purpose. Only the difference is described hereinbelow.

In the embodiment, a modularized ocean energy generating device 200 further includes at least one water flow deflector 6 fixed to the inner frame 3 or the outer frame 1. Preferably, the modularized ocean energy generating device 200 further includes at least eight water flow deflectors 6 axially symmetrically arranged and fixed to the inner frames 3 or the outer frame 1, and the water flow deflectors 6 are located at upstream and downstream sides of the horizontal-axis hydraulic generator along a water flow direction D, respectively.

In the embodiment, the water flow deflector 6 is cylindrical, and the diameter of the water flow deflector decreases gradually. In detail, every two water flow deflectors 6 are axially symmetrical along the crosspiece 31 in the middle of the inner frame 3. In FIG. 6, the diameter of the water flow deflector 6 located at the upper side decreases from top to bottom, and the diameter of the water flow deflector 6 located at the lower side decreases from bottom to top. By the water flow deflectors 6, the water flow is centralized and guided to the hydraulic generator modules 4, allowing the impellers of the generators to suffer more stress and to rotate faster, thereby improving the power generating efficiency. However, the number and shape of the water flow deflector 6 are not limited in the invention. In other embodiments, the water flow deflector 6 may be first quadrate, and then the diameter may be decreased to be cylindrical.

In the embodiment, the modularized ocean energy generating device 200 further includes a buoy platform 11 disposed at the outer frame 1 and parallel to a horizontal plane. The buoy platform 11 may be made of solid buoyancy materials and mainly used for providing buoyancy for the whole modularized ocean energy generating device 200. In a practical application, the buoy platform 11 is disposed at the middle-upper part of the whole outer frame 1 and is located under about eight meters of the ocean horizontal plane.

In the embodiment, the modularized ocean energy generating device 200 further includes a dragging ring 81 and a dragging chain 82. The dragging ring 81 is disposed at the outer frame 1, and one end of the dragging chain 82 is disposed at the dragging ring 81. In detail, a plurality of dragging rings 81 are disposed at the outer frame 1, one end of each one of a plurality of the dragging chains 82 is disposed through the dragging ring 81, and the other end is fixed to the piles on the shore. Preferably, there are more than four dragging rings 81, four of which are disposed at four corners of the outer frame 1, respectively. By the disposition of the dragging ring 81 and the dragging chain 82, the modularized ocean energy generating device 200 can be fixed in the water, which is also convenient for preservation and repair.

Figure 9:
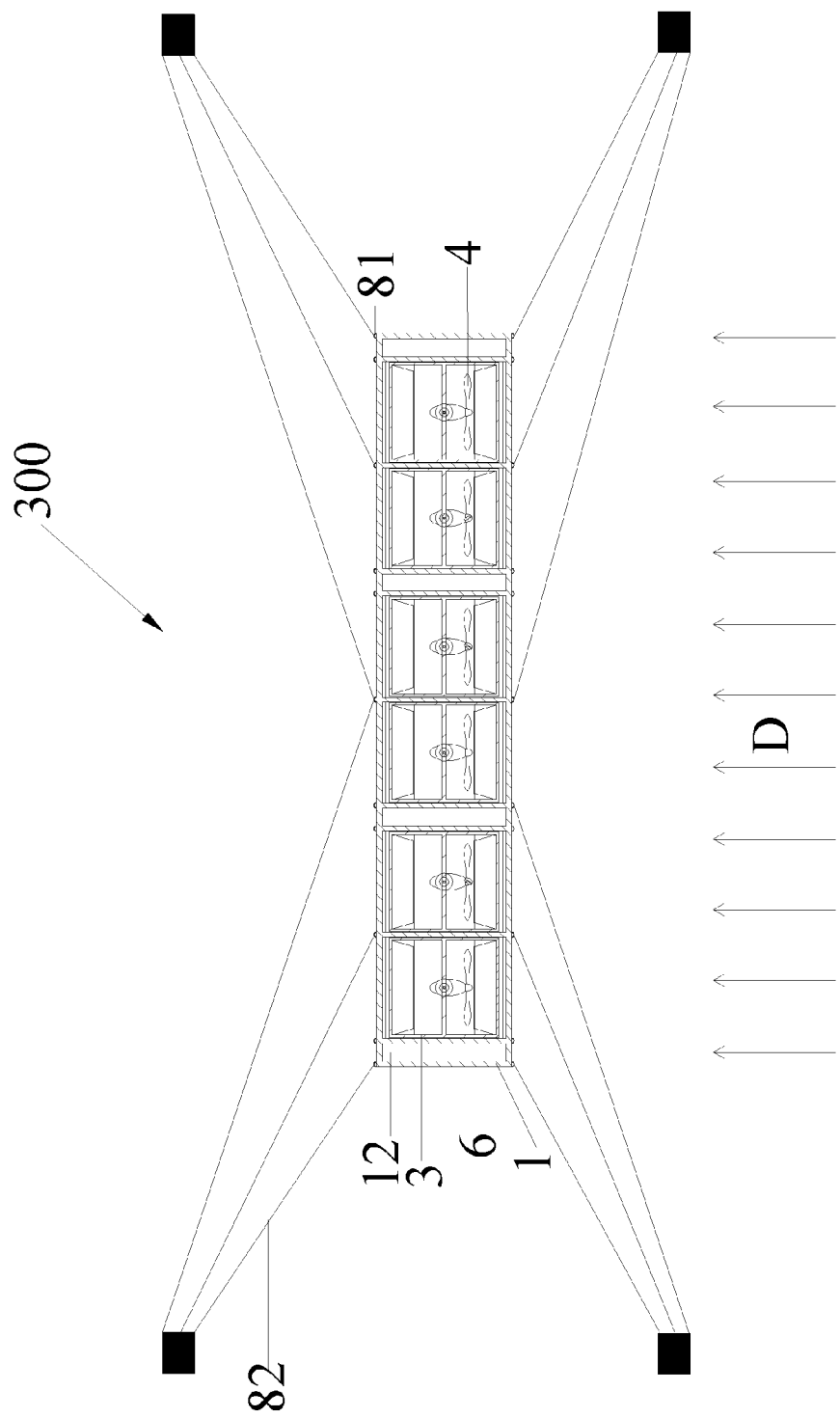
FIG. 9 is a top view of a modularized ocean energy generating device according to the third embodiment of the invention.
Figure 10:
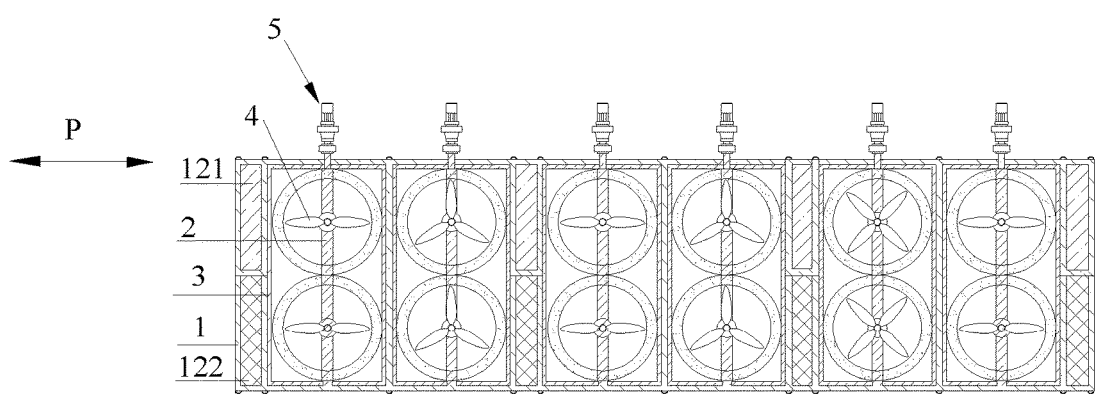
FIG. 10 is a sectional front view of FIG. 9.

FIG. 9 is a top view of a modularized ocean energy generating device according to the third embodiment of the invention. FIG. 10 is a sectional front view of FIG. 9. FIG. 11 is a schematic diagram showing a barrier of the modularized ocean energy generating device according to the third embodiment of the invention. Please refer to FIG. 9 to FIG. 11 together.

In the third embodiment, the structures and functions of the outer frame 1, the mounting shaft 2, the inner frame 3, the hydraulic generator module 4, the water flow deflector 6, the dragging ring 81, the dragging chain 82, and the barriers 111 are described as the second embodiment. The same elements are marked by the same reference numerals and not described in detail for a concise purpose. Only the difference is described hereinbelow.

In the embodiment, the modularized ocean energy generating device 300 further includes at least two buoy units 12 disposed at two sides of the outer frame 1. Each of the buoy units 12 is parallel to a water flow direction D and is vertical to a horizontal plane P. In the embodiment, each buoy unit 12 includes a stationary buoy 121 and an adjustable buoy 122. The buoyancy provided by the stationary buoy 121 is settled. The adjustable buoy 122 can control interior air amount or water amount further to control buoyancy of the adjustable buoy 122, thereby influencing the depth of the whole modularized ocean energy generating device 300 in the water.

In the embodiment, the adjustable buoy 122 is parallel to the stationary buoy 121. When the modularized ocean energy generating device 300 is used, the adjustable buoy 122 is located at one end of the outer frame 1 far away from the horizontal plane P compared with the stationary buoy 121. In detail, in FIG. 10, the adjustable buoy 122 is disposed under the stationary buoy 121, and the adjustable buoy 122 and the stationary buoy 121 are distributed along the same line. Since the buoyancy of the adjustable buoy 122 is adjustable, as the adjustable buoy 122 is disposed at the bottom which is not top, the depth of the whole modularized ocean energy generating device 300 in the water can be adjusted effectively and quickly, thereby allowing the installation and preservation of the whole modularized ocean energy generating device 300 to be more convenient.

In the embodiment, the number of the inner frame 3 is six, and the number of the buoy unit 12 is four. Two of the buoy units 12 are disposed at left and right sides of the outer frame 1, and the other two buoy units 12 are disposed between two adjacent inner frames 3. Thus, the buoy units 12 are not only disposed at two sides of the outer frame 1, and also disposed in the middle of the outer frame 1. Therefore, the distribution of buoyancy borne by the entire modularized ocean energy generating device 300 is more uniform, such that the location of the modularized ocean energy generating device 300 in the water is more stable. However, the invention does not limit the number of the inner frame 3 and the number of the buoy unit 12.

In the embodiment, every two horizontal-axis hydraulic generators are mounted on one mounting shaft 2.

In the embodiment, the modularized ocean energy generating device 300 further includes at least two barriers 111. The two barriers 111 are disposed at the inner frame 3 or the outer frame 1 (not shown in FIG. 9). The at least two barriers 111 are located at the upstream and downstream sides of the hydraulic generator module 4 along the water flow direction D, respectively. The barriers 111 are vertical to the water flow direction D and are vertical to the horizontal plane P. In the embodiment, the two barriers 111 are fixed between the inner frame 3 and the outer frame 1. However, the invention is not limited thereto. In other embodiments, the barriers 111 may be disposed outside of the outer frame 1 and be located at upstream and downstream sides of the outer frame 1. By the barriers 111, the ocean rubbish can be effectively prevented from drawing into the hydraulic generator module 4, thereby protecting the hydraulic generator module 4 and prolonging the service life of the hydraulic generator module 4. In FIG. 11, the barrier 111 has lattice-type lines. However, the invention is not limited.

Figure 12:
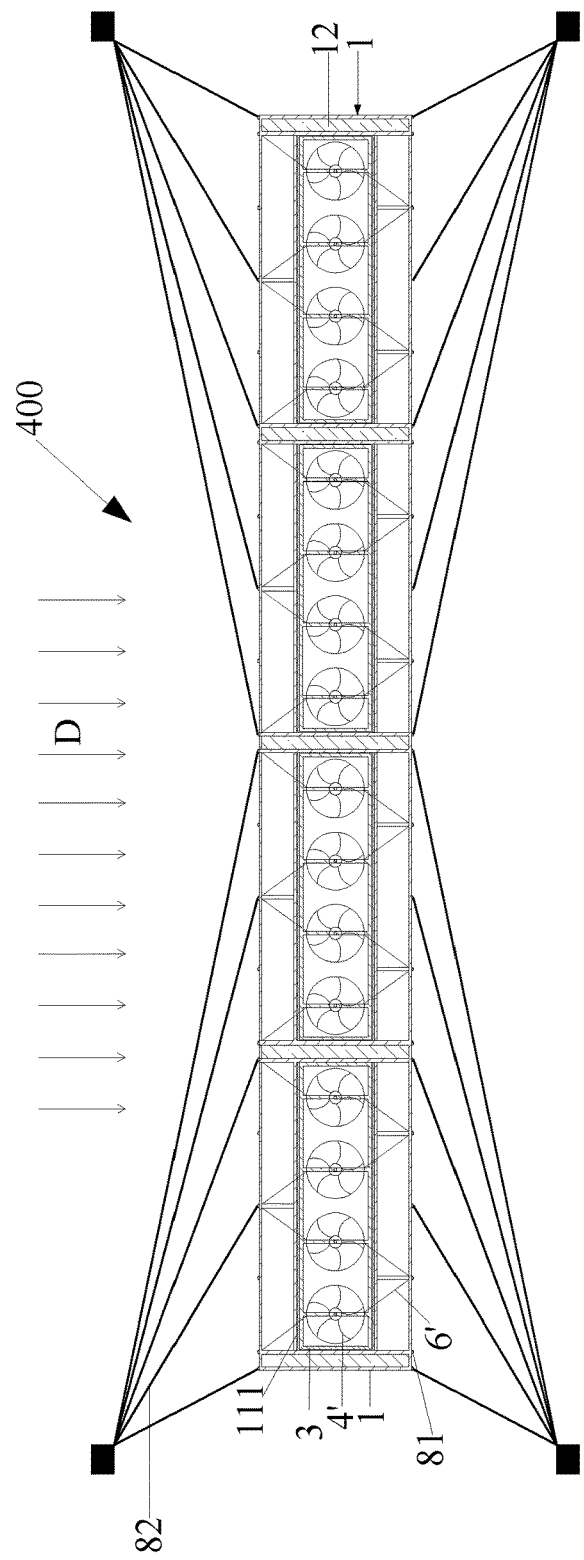
FIG. 12 is a top view of a modularized ocean energy generating device according to the fourth embodiment of the invention.
Figure 13:
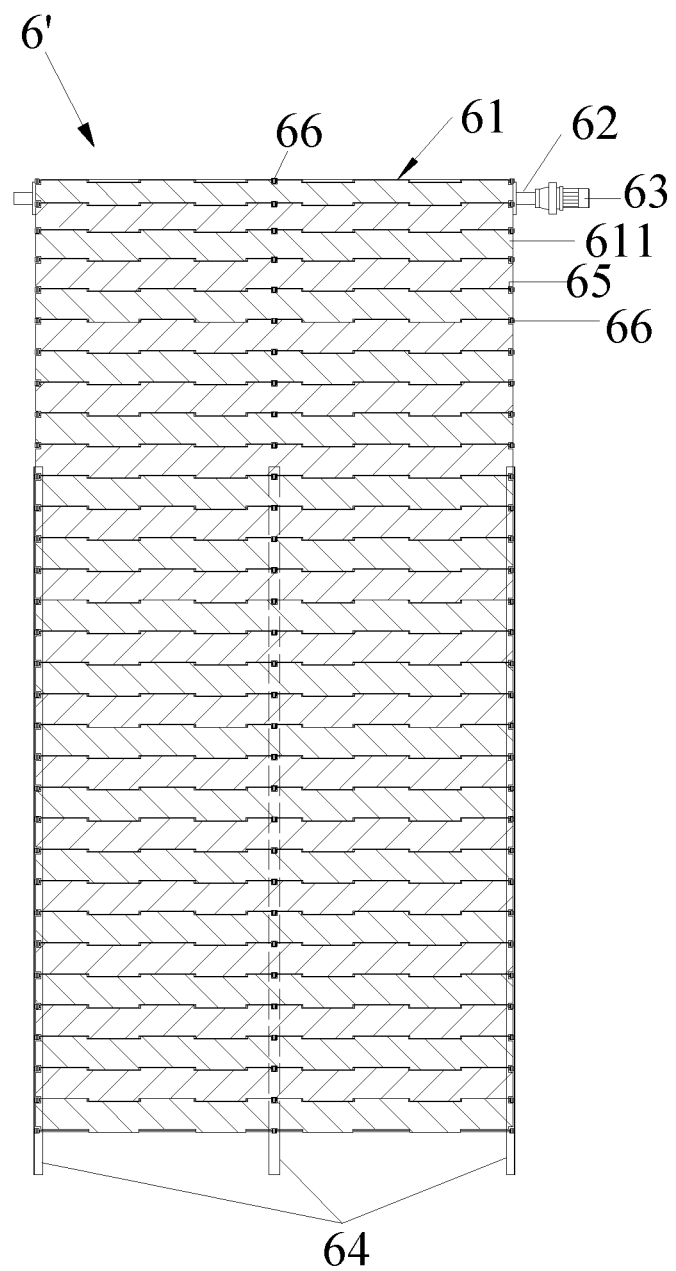
FIG. 13 is a front view of a rolling-door-type load regulator module of the modularized ocean energy generating device according to the fourth embodiment of the invention.
Figure 14:
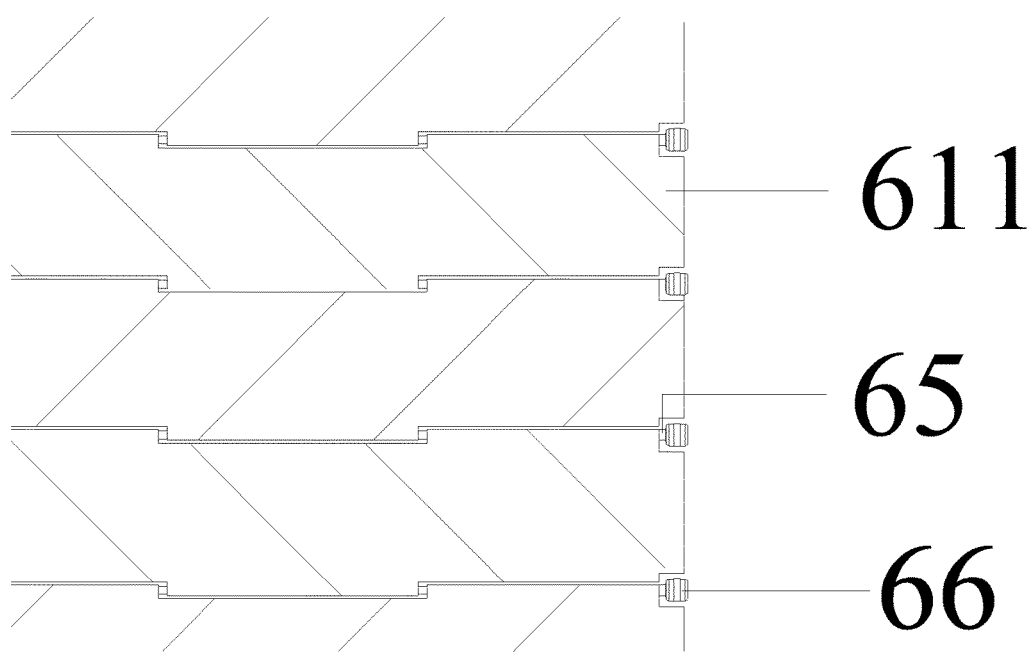
FIG. 14 is a partially enlarged view of FIG. 13.
Figure 15:
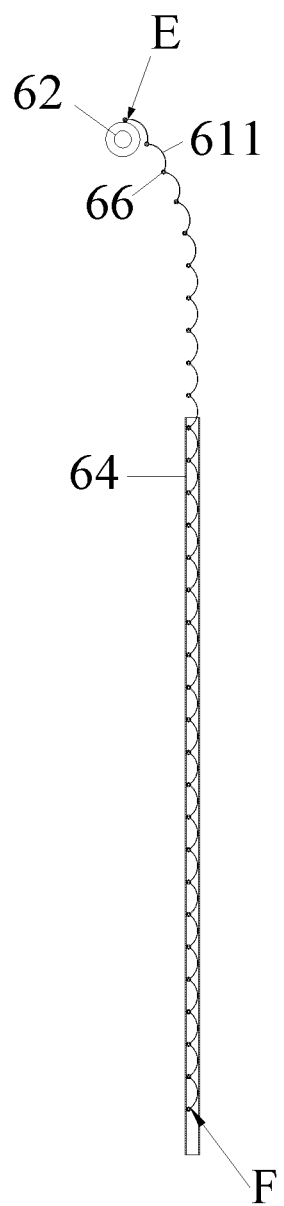
FIG. 15 is a side view of FIG. 13.
Figure 16:
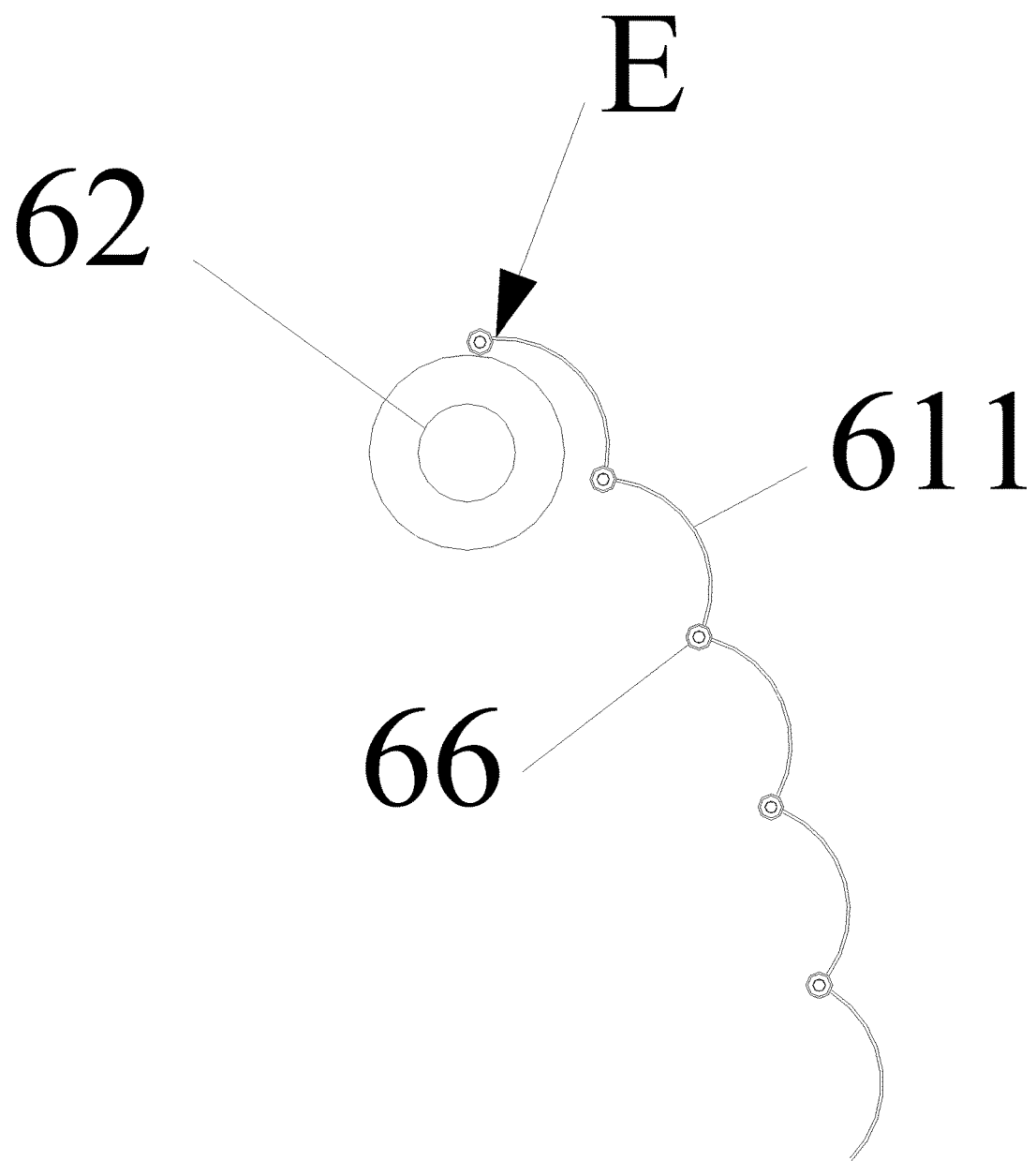
FIG. 16 is partially enlarged view of FIG. 15.

FIG. 12 is a top view of a modularized ocean energy generating device according to the fourth embodiment of the invention. FIG. 13 is a front view of a rolling-door-type load regulator module of the modularized ocean energy generating device according to the fourth embodiment of the invention. FIG. 14 is a partially enlarged view of FIG. 13. FIG. 15 is a side view of FIG. 13. FIG. 16 is a partially enlarged view of FIG. 15. Please refer to FIG. 12 to FIG. 16 together.

In the fourth embodiment, the structures and functions of the outer frame 1, the inner frame 3, the barrier 111, the buoy unit 12, the dragging ring 81, and the dragging chain 82 are described as the third embodiment, and the same elements are marked by the same reference numerals and not described in detail for a concise purpose. Only the difference is described hereinbelow.

In the embodiment, the hydraulic generator module 4' is a vertical-axis hydraulic generator, and a direction of an axis of the vertical-axis hydraulic generator is vertical to a horizontal plane. Four hydraulic generator modules 4' are disposed in one inner frame 3. However, the detailed number and type of the hydraulic generator module 4' in the inner frame are not limited in the invention.

The modularized ocean energy generating device 400 further includes at least one rolling-door-type load regulator module 6', and each rolling-door-type load regulator module 6' includes a water guiding unit 61, a roller spindle 62, and a driver 63. The water guiding unit 61 includes at least two water guiding plates 611 connected side by side. In the embodiment, the number of the water guiding plate 611 is more. However, the invention is not limited. The number of the water guiding plate 611 is at least two, effectively reducing the length of each water guiding plate 611 along a direction vertical to the horizontal plane and increasing resistance of the water guiding plate 611 against impaction of the water flow. If the length of the water guiding plate 611 along the vertical direction is too long, since the impaction of the water flow is large, the water guiding plate 611 is easily deformed and even broke in the middle.

The roller spindle 62 is fixed to one end E of the water guiding unit 61. The driver 63 is connected to the roller spindle 62, and the driver 63 drives the roller spindle 62 to rotate to unfold or fold the water guiding unit 61. In the embodiment, the section of the water guiding plate 611 is cambered, that is, the water guiding plate 611 is a cambered plate. Therefore, when the roller spindle 62 folds the water guiding unit 61, the water guiding plate 611 is further attached to the roller spindle 62 to reduce space. However, the invention is not limited.

In the embodiment, a direction of an axis of the roller spindle 62 is parallel to the horizontal plane. However, the invention is not limited. In other embodiments, the roller spindle 62 may be vertical to the horizontal plane and be disposed at the outer frame 1. In the invention, the disposing position of the roller spindle 62 is not limited.

In the embodiment, the water guiding module 6' further includes at least two guiding rails 64, and the two guiding rails 64 are located at the same side of the roller spindle 62 in parallel. When the roller spindle 62 unfolds the water guiding unit 61, two sides of the other end F of the water guiding unit 61 enter into the two guiding rails 64, respectively. In the embodiment, one water guiding unit 61 corresponds to three guiding rails 64, two of which are disposed at two sides of the water guiding unit 61, and the other guiding rail 64 is disposed in the middle of the water guiding unit 61. However, the number of the guiding rail 64 is not limited in the invention. One end E of the water guiding unit 61 is fixed via connection with the roller spindle 62, and the other end F of the water guiding unit 61 is used for spacing via the guiding rail 64. As two ends of the water guiding unit 61 are spaced, respectively, the unfolded water guiding unit 61 can be fully unfolded to form a "protective screen" to stop or guide the water flow.

In the embodiment, the water guiding module 6' further includes at least one connecting shaft 65 and at least two rollers 66. The at least two water guiding plates 611 are connected via the connecting shaft 65, and the rollers 66 are sleeved on two ends of the connecting shaft 65. When the roller spindle 62 unfolds the water guiding unit 61, two sides of the other end F of the water guiding unit 61 enter into the two guiding rails 64, respectively, and the two rollers 66 slide in the two guiding rails 64, respectively. In the embodiment, the number of the connecting shaft 65 is less one compared with the number of the water guiding plate 611, each connecting shaft 65 corresponds to three rollers 66, and the number of the roller 66 corresponds to the number of the guiding rail 64. However, the invention is not limited.

In the embodiment, each water guiding plate 611 has concave-convex holes at two edges, respectively, and edges of the adjacent two water guiding plates 611 can fit with each other. The connecting shaft 65 passes through the holes to connect the water guiding plate 611. The connecting shaft 65 is connected with the water guiding plate 611, allowing each water guiding plate 611 to be capable of rotating to change the direction. Therefore, when the water guiding unit 61 is folded, the water guiding plates 611 can be folded around the roller spindle 62. When the water guiding unit 61 is unfolded, a plurality of the water guiding plates 611 are nearly located at one line totally, further to form the "protective screen" to effectively stop or guide the oncoming water flow. As the roller spindle 62 continuously unfolds the water guiding unit 61, the rollers 66 roll along the guiding rails 64 from the top to bottom in FIG. 15, further to unfold the water guiding unit 61. The rollers 66 can effectively guide two sides of the other end F of the water guiding unit 61 to enter into the two guiding rails 64, further to effectively fix the other end F.

In the embodiment, an angle between the water guiding plate 611 and the water flow direction D is larger than zero degree and smaller than 90 degrees. Thus, the water guiding module 6' in the embodiment of the invention can stop the water flow and guide the water flow.

In detail, when the water flow is smaller, the driver 63 drives the roller spindle 62 to totally fold the downstream water guiding plate 611, and the upstream water guiding plate 611 is totally unfolded to form a protective screen, further to effectively stop the water flow flowing into the resistance side of the impeller of the hydraulic generator module 4', and to guide the upstream water flow totally to the moving side of the impeller. That is, the water flow is guided to a direction vertical to a concave part of the blade of the hydraulic generator module 4', thereby increasing impaction of the water flow to the hydraulic generator module 4', increasing the rotation of the hydraulic generator module 4', and improving the generating power of the generator. When the generating power has wide fluctuations due to a higher speed of the water flow, the driver 63 drives the roller spindle 62 to fold the upstream water guiding plate 611 and partly unfold the downstream water guiding plate 611, and the water flow flows into the resistance side of the hydraulic generator module 4', thereby effectively slowing fast rotation of the impeller of the hydraulic generator module 4', thus to stabilizing the generating power.

Therefore, according to the rolling-door-type water guiding module 6' of the modularized ocean energy generating device 400 in the embodiment, when the water flow is larger, the upstream water guiding plate 611 can be folded, and the downstream water guiding plate 611 is partly unfolded to stop the water flow to turn down the output load of the hydraulic generator module 4'. When the water flow is smaller, the upstream water guiding plate 611 is totally unfolded, to effectively guide the water flow to flow along a direction vertical to a concave part of the blade of the hydraulic generator module 4', thereby increasing the impaction of the water flow to the hydraulic generator module 4', increasing the rotation of the hydraulic generator module 4', and improving the generating power. Therefore, the power of the modularized ocean energy generating device 300 can be stably output and be directly used, thereby solving the problem that the generating output power of the conventional ocean energy power generator has wide fluctuations and poor stability.

At preset the maximum generating power of the ocean energy power generator in the world using a horizontal-axis hydraulic generator module or a vertical-axis hydraulic generator module is only 1.2 MW. However, the generating power of the modularized ocean energy generating device (totally sixteen hydraulic generator modules) can reach 5 MW. Thus, the problem that the conventional ocean energy power generator has lower generating power and fails to be commercialized is completely overcome, and the technology bias only focusing on enlarging the single hydraulic generator in the prior art is also solved.

In other embodiments, if the hydraulic generator module 4' is a horizontal-axis hydraulic generator, an angle between the water guiding plate 611 of the rolling-door-type water guiding module 6' and the water flow direction D may be 90 degrees. Since all blades of the horizontal-axis hydraulic generator suffer force, when the speed of the water flow is faster, the driver 63 can drive the roller spindle 62 to fold the downstream water guiding plate 611 and to unfold the upstream water guiding plate 611, thereby forming a protective screen to effectively stop the water flow flowing to the horizontal-axis hydraulic generator, thus preventing rapid increase of the generating power from causing instability of the generating power and failing to be directly output. When the speed of the water flow is slower, the roller spindle 62 can fold the water guiding plate 611, thereby allowing the water flow to flow into the horizontal-axis hydraulic generator.

Figure 17:
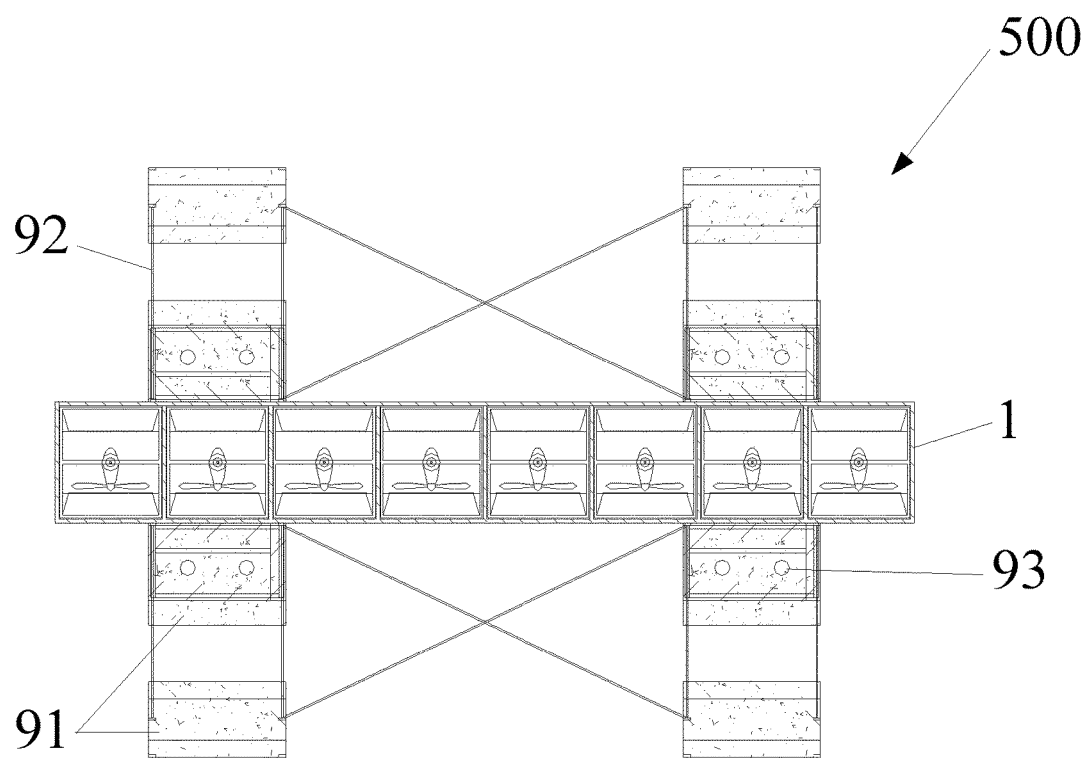
FIG. 17 is a top view of a modularized ocean energy generating device according to the fifth embodiment of the invention.
Figure 18:
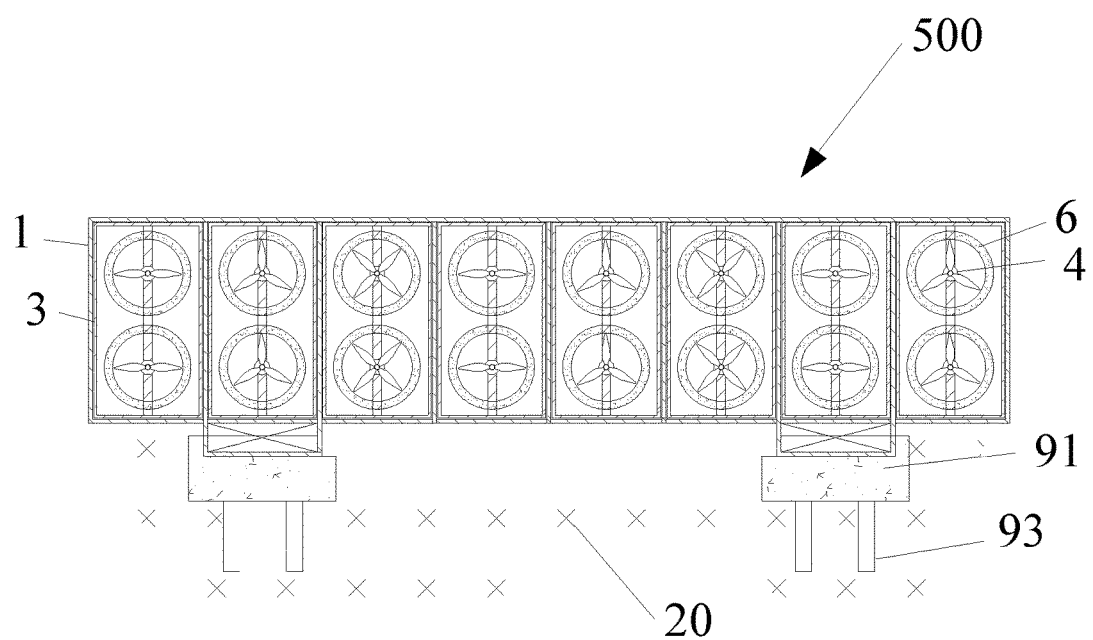
FIG. 18 is a sectional front view of FIG. 17.
Figure 19:
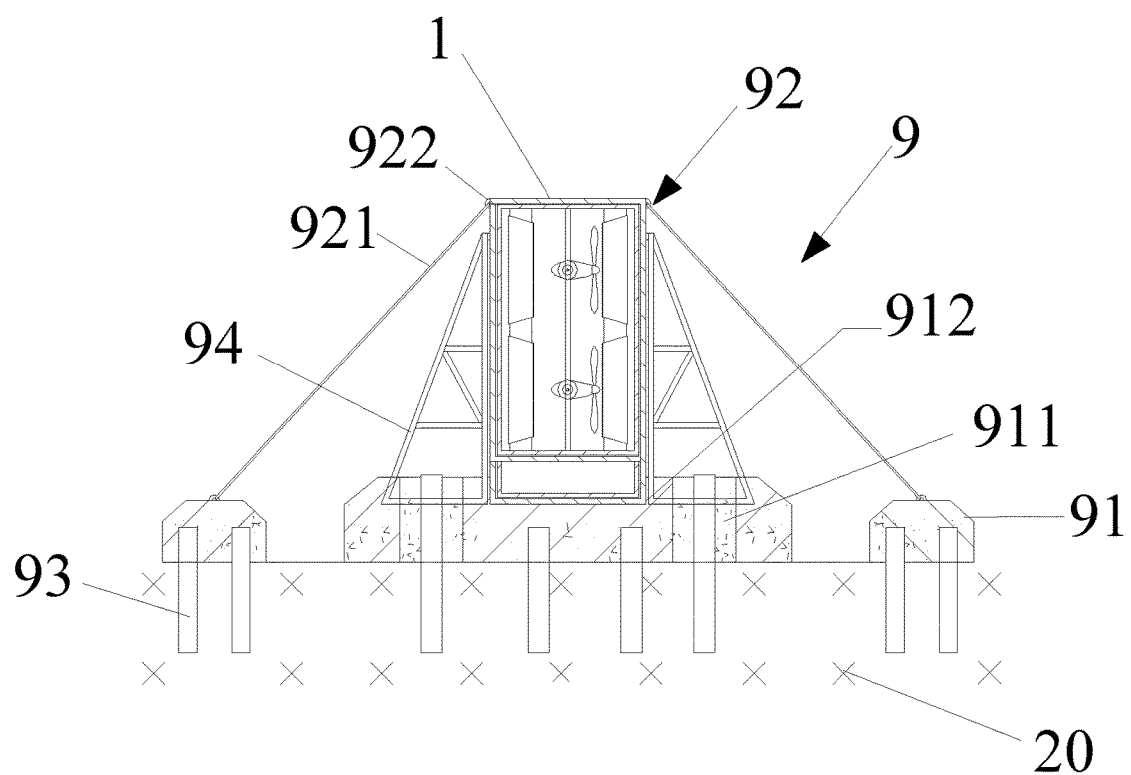
FIG. 19 is a sectional side view of FIG. 17.

FIG. 17 is a top view of a modularized ocean energy generating device according to the fifth embodiment of the invention. FIG. 18 is a sectional front view of FIG. 17. FIG. 19 is a sectional side view of FIG. 17. Please refer to FIG. 17 to FIG. 19 together. In the embodiment, the structures and functions of the outer frame 1, the mounting shaft 2, the inner frame 3, the hydraulic generator module 4, and the water flow deflector 6 are described as the third embodiment, and the same elements are marked by the same reference numerals and not described in detail for a concise purpose. Only the difference is described hereinbelow.

In the embodiment, the modularized ocean energy generating device 500 further includes a fixing device 9, and the fixing device 9 includes a base 91, a fixing unit 92, and a plurality of anchor piles 93. The base 91 has a fixing groove 912. The outer frame 1 is fixed to the fixing groove 912 of the base 91 via the fixing unit 92. At least one of the anchor piles 93 is disposed through the base 91 and is inserted into the seabed 20 to be fixed.

In the embodiment, the base 91 is a reinforced concrete base having a plurality of immovable spaces 911, a cross-sectional area (the cross section parallel to the horizontal plane) of the immovable space 911 is larger than the radial cross-sectional area of each anchor pile 93, and the concrete is poured and filled in the gap between the immovable space 911 and the anchor pile 93. In a practical application, the base 91 is prefabricated to form a reinforced concrete frame, and then is hung into the ocean. Then, each of the anchor piles 93 is allowed to pass through the immovable space 911 to enter into the seabed 20, and finally the concrete is poured into the immovable space 911 for a second time to fix the anchor pile 93. Via a plurality of immovable spaces 911 with the large cross-sectional area, the base 91 is a frame with a plurality of "spaces" or "cavities". Therefore, the weight of the base 91 can be greatly reduced, thus to be convenient for hanging the base 91 into the ocean, thereby facilitating installation.

In the embodiment, a direction of an axis of the fixing groove 912 is parallel to a horizontal plane and is vertical to a water flow direction. In the embodiment, the fixing groove 912 is a rectangle groove, and is disposed at the top of the base 91. The bottom of the fixing groove 912 is lower than the top surface of the base 91. In the embodiment, the width of the fixing groove 912 can be larger than the width of the outer frame 1, to just dispose the outer frame 1. Via the fixing groove 912 disposed at the surface of the base 91, the position of the modularized ocean energy generating device 500 can be fixed, thereby overcoming the problem that the power generator in the prior art is easily deflected caused by huge impaction by the tidal current. Therefore, the modularized ocean energy generating device 500 in the embodiment of the invention can always face the tidal current to ensure the maximum usage of the tidal current energy thus to improve the power generating efficiency.

In a practical application, to reduce the weight and volume of the base 91, the base 91 includes three detachable parts. The fixing unit 92 includes a plurality of chains 921 and a plurality of rings 922, some of the rings 922 are fixed to two bases 91 without fixing the outer frame 1, and the other rings 922 are fixed to the outer frame 1. Two ends of each chain 921 are connected to the ring 922 on the base 91 and the ring 922 on the outer frame 1, respectively. In the embodiment, the chains 921 and the rings 922 are symmetrically deposed at two sides of the outer frame 1, and the outer frame 1 can suffer pull from two sides to keep fixed. Therefore, no matter of the rising tide or the fall tide, the outer frame 1 can keep stable further to allow the whole modularized ocean energy generating device 500 to face the impaction of the tidal current to improve the power generating efficiency. In one embodiment, the chain 921 may be a dragging chain or a rigid pull rod.

In the embodiment, the fixing device 9 further includes a guiding frame 94. In a practical application, the base 91 is first hung into the seabed 20, and then the outer frame 1 is put into the fixing groove 912 of the base 91. One edge of the guiding frame 94 vertical to the horizontal plane can guide the outer frame 1 to correctly enter into the fixing groove 912. The top of the guiding frame 94 is exposed from the horizontal plane, and the installing persons can easily observe if the base 91 is disposed horizontally via the guiding frame 94.

Figure 20:
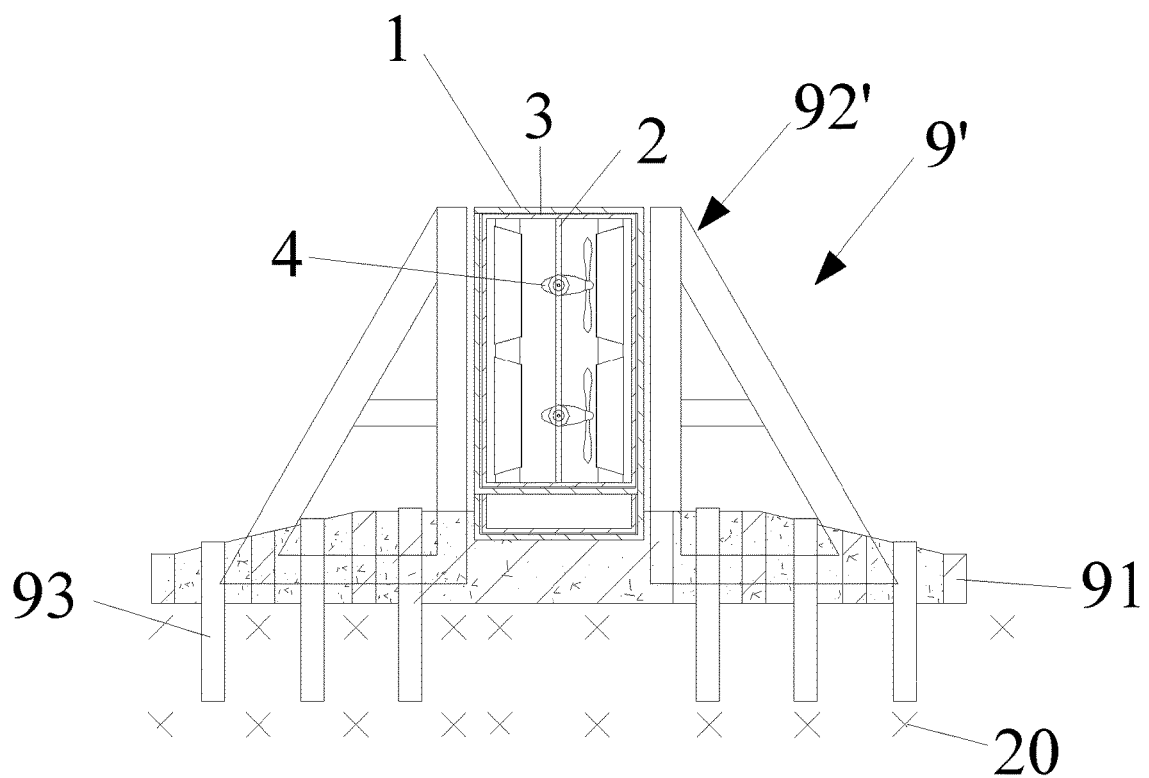
FIG. 20 is a sectional side view of a modularized ocean energy generating device according to the sixth embodiment of the invention.

FIG. 20 is a sectional side view of a modularized ocean energy generating device according to the sixth embodiment of the invention. In the sixth embodiment, the structures and functions of the outer frame 1, the mounting shaft 2, the inner frame 3, and the hydraulic generator module 4 are described as the fifth embodiment. Therefore, there is no detailed description for a concise purpose. The same elements are marked by the same reference numerals. Only the difference is described hereinbelow.

In the embodiment, the fixing device 9' includes a base 91, a fixing unit 92', and a plurality of anchor piles 93. The fixing unit 92' is a girder, one edge of the girder is inserted into the base 91, and the other edge extends along the height direction of the outer frame 1. Preferably, the girder is a girder steel base. In the embodiment, the cross section of the girder is a right-angled triangle, one right-angled edge of the girder is poured and fixed to the base 91 via concrete, and the other right-angled edge is parallel to the height direction of the outer frame 1. The rectangle is the most stable structure. In the embodiment, the fixing units 92' are symmetrically disposed at two sides of the outer frame 1, respectively, thereby allowing the outer frame 1 to be stably fixed at two directions. Therefore, no matter of the rising tide or the falling tide, the outer frame 1 can keep stable, to allow the whole modularized ocean energy generating device to face the impaction of the tidal current, thus to improve the power generating efficiency. The length of the right-angled edge along the height direction of the girder is not limited in the invention.

Figure 21:
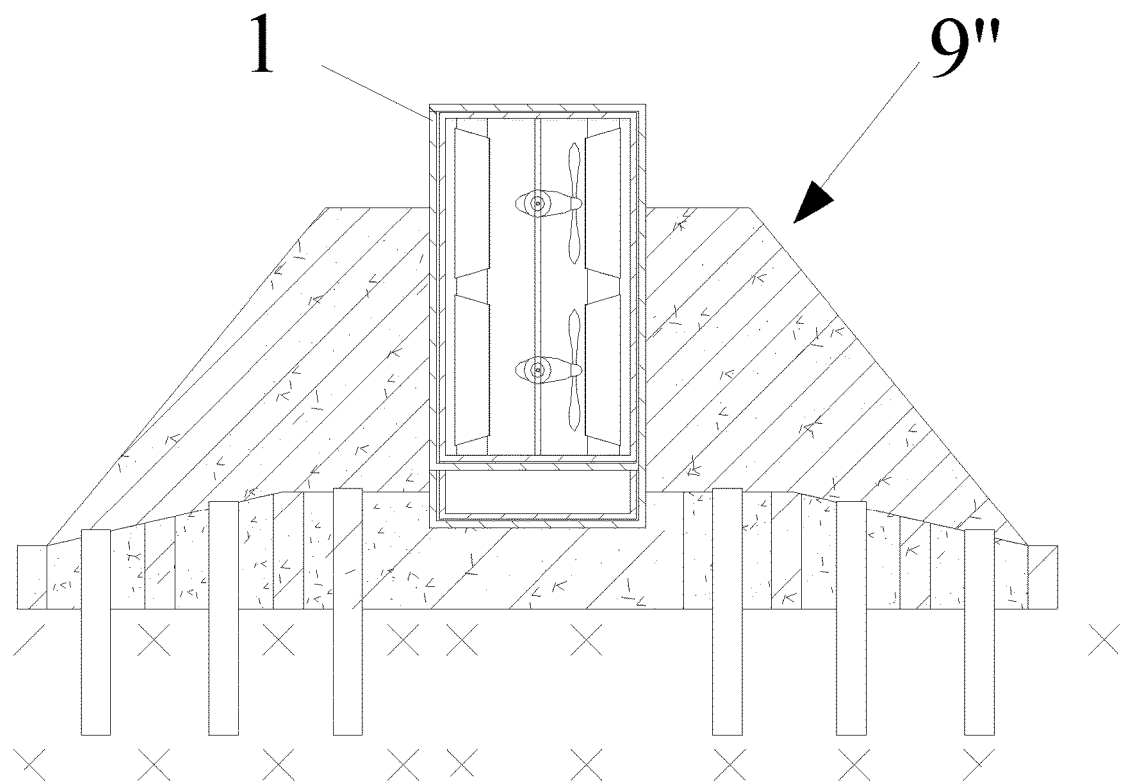
FIG. 21 is a sectional side view of a modularized ocean energy generating device according to the seventh embodiment of the invention.

FIG. 21 is a sectional side view of a modularized ocean energy generating device according to the seventh embodiment of the invention. The difference between the sixth embodiment and the seventh embodiment is that the fixing device 9" in the seventh embodiment is a concrete block. In the embodiment, the height of the concrete block is larger than one half of the height of the outer frame 1 of the modularized ocean energy generating device. However, the height of the concrete block is not limited in the invention.

To sum up, the built-in module can be separatably coupled to the outer frame, thereby enabling the modularized assembly and replacement for the generating device. The inner frame, the hydraulic generator module, the mounting shaft, the driving unit, and the barriers form the built-in module as a whole, and the built-in module can be hung and then transferred into the outer frame from top to bottom. Therefore, the assembly and replacement of the built-in module for the modularized ocean energy generating device can be realized above the water surface, preservation and installation costs are greatly reduced, and the problem that the conventional ocean energy power generator fails to be large-scale and commercialized is overcome. Further, by at least two barriers or fences disposed at upstream and downstream sides, the modularized ocean energy generating device in the embodiment of the invention prevents rubbish/garbage or floating ice in the ocean from damaging the hydraulic generator module, thereby prolonging the service life of the hydraulic generator module. In addition, by the rotatable mounting shaft, the impeller of the horizontal-axis hydraulic generator is allowed to always face the water flow, regardless of which direction the water flow flows into, thereby ensuring the maximum generating power. This case is particularly appropriate for power generation by tidal energy.

Specially, if the barriers are disposed at the inner frame, the cleaning or removal of the garbage on the barriers or the replacement or repair of the barriers can be carried out by lifting the built-in module from bottom to top, which is very convenient and greatly save the maintenance costs.

In one embodiment, a plurality of the horizontal-axis hydraulic generators can be mounted on one mounting shaft, thereby greatly improving the generating power. By the water flow deflector, the water flow is intensively guided to the horizontal-axis hydraulic generator, such that the impeller of the horizontal-axis hydraulic generator bear greater stress and rotate faster, thus to improve the power generation efficiency. Preferably, the water flow deflectors can be disposed at upstream and downstream sides of the horizontal-axis hydraulic generator. Thus, even if the tidal current changes the direction (such as a rising tide and a falling tide), the water flow deflector can effectively guide the water flow.

In one embodiment, the rolling-door-type load regulator module can adjust the load suffered by the hydraulic generator modules. Therefore, the power generated by the modularized ocean energy generating device can be stably output and be directly used, thereby solving the problem that the generating output power of the conventional ocean energy power generator has wide fluctuations and poor stability.

In the embodiment of the invention, the water flow limiting plate prevents the garbage or floating ice in the ocean form damaging the hydraulic generator modules and prevents the water flow in other directions from interfering with the hydraulic generator modules, thereby improving the power generating efficiency of the generator modules.

In the embodiment of the invention, the modularized ocean energy generating device may be fixed in a floating type via the buoy platform or the buoy unit and may also be fixed to the seabed via the fixing device. In addition, by the dragging ring and the dragging chain, the modularized ocean energy generating device may be effectively fixed in the water, and it is also convenient for maintenance and repair.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A built-in module for a modularized ocean energy generating device, the modularized ocean energy generating device comprising an outer frame, the built-in module comprising:
    an inner frame detachably disposed in the outer frame;
    at least one hydraulic generator module generating power from water flow, disposed in the inner frame, an axis of the hydraulic generator module being parallel to a horizontal plane;
    at least one mounting shaft, the at least one hydraulic generator module being mounted at the at least one mounting shaft, the at least one mounting shaft being rotatably mounted at the inner frame;
    at least one driving unit, directly connected to the mounting shaft and driving the mounting shaft to rotate about a vertical axis; and at least two barriers disposed at the inner frame or the outer frame and located at upstream and downstream sides of the hydraulic generator module along a water flow direction, respectively, wherein the at least one driving unit is located above a water surface.

2. The built-in module for the modularized ocean energy generating device according to claim 1, further comprising at least one water flow deflector fixed to the inner frame or the outer frame.

3. The built-in module for the modularized ocean energy generating device according to claim 2, wherein the water flow deflector is cylindrical, and the diameter of the water flow deflector decreases gradually.

4. The built-in module for the modularized ocean energy generating device according to claim 1, further comprising at least one water flow limiting plate disposed at the inner frame or the outer frame, the at least one water flow limiting plate extending in a vertical plane to align the water flow direction.

5. The built-in module for the modularized ocean energy generating device according to claim 1, further comprising at least one buoy platform attached to the outer frame and parallel to the horizontal plane, the at least one buoy platform providing buoyancy to the modularized ocean energy generating device.

6. The built-in module for the modularized ocean energy generating device according to claim 1, further comprising at least two buoy units disposed at two sides of the inner frame or the outer frame, each buoy unit being parallel to the water flow direction and vertical to the horizontal plane.

7. The built-in module for the modularized ocean energy generating device according to claim 1, further comprising a dragging ring and a dragging chain, the dragging ring being disposed at the outer frame, one end of the dragging chain being disposed at the dragging ring.

8. The built-in module for the modularized ocean energy generating device according to claim 1, further comprising a fixing device that connects the built-in module to a seabed, the fixing device including:
a base having a fixing groove;
a fixing system of chains and rings, the outer frame being fixed to the fixing groove of the base via the fixing system, wherein the rings are fixed to the base and the outer frame; and
a plurality of anchor piles, at least one of the anchor piles being disposed through the base and inserted into the seabed to be fixed.

9. The built-in module for the modularized ocean energy generating device according to claim 1, wherein the outer frame is an array of rigid grid walls perpendicular to the water flow direction, the inner frame being inserted into the outer frame.

10. A modularized ocean energy generating device, comprising:
an outer frame; and
at least one built-in module, comprising:
an inner frame detachably disposed in the outer frame;
at least one hydraulic generator module generating power from water flow, disposed in the inner frame, an axis of the hydraulic generator module being parallel to a horizontal plane;
at least one mounting shaft, the at least one hydraulic generator module being mounted on the at least one mounting shaft, the at least one mounting shaft being rotatably mounted at the inner frame;
at least one driving unit, directly connected to the mounting shaft and driving the mounting shaft to rotate about a vertical axis; and
at least two barriers disposed at the inner frame or the outer frame and located at upstream and downstream sides of the hydraulic generator module along a water flow direction, respectively.

11. The modularized ocean energy generating device according to claim 10, further comprising at least one water flow deflector fixed to the inner frame or the outer frame.

12. The modularized ocean energy generating device according to claim 11, wherein the water flow deflector is cylindrical, and the diameter of the water flow deflector decreases gradually.

13. The modularized ocean energy generating device according to claim 10, further comprising at least one water flow limiting plate disposed at the inner frame or the outer frame, the at least one water flow limiting plate extending in a vertical plane to align the water flow direction.

14. The modularized ocean energy generating device according to claim 10, further comprising at least one buoy platform attached to the outer frame and parallel to the horizontal plane, the at least one buoy platform providing buoyancy to the modularized ocean energy generating device.

15. The modularized ocean energy generating device according to claim 10, further comprising at least two buoy units disposed at two sides of the inner frame or the outer frame, each buoy unit being parallel to the water flow direction and vertical to the horizontal plane.

16. The modularized ocean energy generating device according to claim 10, further comprising a dragging ring and a dragging chain, the dragging ring being disposed at the outer frame, one end of the dragging chain being disposed at the dragging ring.

17. The modularized ocean energy generating device according to claim 10, further comprising a fixing device that connects the built-in module to a seabed, the fixing device including:
a base having a fixing groove;
a fixing system of chains and rings, the outer frame being fixed to the fixing groove of the base via the fixing system, wherein the rings are fixed to the base and the outer frame; and
a plurality of anchor piles, at least one of the anchor piles being disposed through the base and inserted into the seabed to be fixed.

18. The modularized ocean energy generating device according to claim 10, wherein the driving unit is located above a water surface.

* * * * *